(12) United States Patent
Leppanen et al.

(10) Patent No.: US 9,055,105 B2
(45) Date of Patent: Jun. 9, 2015

(54) METHOD AND APPARATUS FOR ENGAGING IN A SERVICE OR ACTIVITY USING AN AD-HOC MESH NETWORK

(75) Inventors: Kari J. Leppanen, Helsinki (FI); Markku T. Turunen, Helsinki (FI); Sami Virtanen, Espoo (FI); Mikko Tirronen, Helsinki (FI); Mika Kasslin, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 680 days.

(21) Appl. No.: 12/475,430

(22) Filed: May 29, 2009

(65) Prior Publication Data

US 2010/0304759 A1 Dec. 2, 2010

(51) Int. Cl.
| | |
|---|---|
| H04W 4/02 | (2009.01) |
| H04W 4/20 | (2009.01) |
| H04W 84/18 | (2009.01) |
| H04L 29/08 | (2006.01) |
| H04L 29/06 | (2006.01) |
| H04M 1/725 | (2006.01) |
| H04W 40/02 | (2009.01) |

(52) U.S. Cl.
CPC ............ *H04L 67/16* (2013.01); *H04L 63/0421* (2013.01); *H04M 1/72569* (2013.01); *H04M 1/72572* (2013.01); *H04W 4/02* (2013.01); *H04W 4/023* (2013.01); *H04W 4/20* (2013.01); *H04W 40/023* (2013.01); *H04W 84/18* (2013.01); *H04L 67/24* (2013.01); *H04L 67/12* (2013.01); *H04L 67/18* (2013.01); *H04L 69/22* (2013.01); *H04L 69/32* (2013.01); *H04L 69/325* (2013.01)

(58) Field of Classification Search
USPC ........................................................ 455/456.2
See application file for complete search history.

(56) References Cited

U.S. PATENT DOCUMENTS

| | | | | |
|---|---|---|---|---|
| 5,371,734 | A | | 12/1994 | Fischer |
| 6,941,372 | B2 | | 9/2005 | Pearson |
| 7,159,035 | B2 | * | 1/2007 | Garcia-Luna-Aceves et al. ............................. 709/241 |
| 7,567,673 | B2 | * | 7/2009 | Fukuzawa et al. ............ 380/270 |
| 8,014,378 | B1 | | 9/2011 | Yoon et al. |
| 8,165,106 | B2 | | 4/2012 | Yang et al. |
| 8,571,519 | B2 | * | 10/2013 | Ginzboorg ..................... 455/411 |
| 2003/0204742 | A1 | * | 10/2003 | Gupta et al. .................. 713/200 |

(Continued)

FOREIGN PATENT DOCUMENTS

| | | |
|---|---|---|
| CN | 1455569 A | 11/2003 |
| CN | 1893434 A | 1/2007 |

(Continued)

OTHER PUBLICATIONS

International search report and written opinion for corresponding international application No. PCT/IB2010/052403 dated Sep. 10, 2010, pp. 1-10.

(Continued)

*Primary Examiner* — Steven Kelley
(74) *Attorney, Agent, or Firm* — Ditthavong & Steiner, P.C.

(57) ABSTRACT

An approach is provided for discovering a location-based service over an ad-hoc mesh network. A location-based service is discovered sending an anonymous flooding message including a query over the ad-hoc mesh network. A wireless node replies to the flooding message over the ad-hoc mesh network with a pointer to the discovered location-based service.

22 Claims, 26 Drawing Sheets

(56) References Cited

U.S. PATENT DOCUMENTS

| | | |
|---|---|---|
| 2005/0025092 A1 | 2/2005 | Morioka et al. |
| 2005/0193106 A1* | 9/2005 | Desai et al. ............... 709/223 |
| 2006/0034217 A1 | 2/2006 | Kwon et al. |
| 2006/0120314 A1 | 6/2006 | Krantz et al. |
| 2006/0212592 A1 | 9/2006 | Gupta et al. |
| 2006/0285510 A1* | 12/2006 | Kim et al. ............... 370/312 |
| 2007/0002866 A1 | 1/2007 | Belstner et al. |
| 2007/0086424 A1 | 4/2007 | Calcev et al. |
| 2007/0086426 A1 | 4/2007 | Bonta et al. |
| 2007/0097885 A1* | 5/2007 | Traversat et al. ......... 370/254 |
| 2007/0161364 A1 | 7/2007 | Surineni et al. |
| 2007/0226777 A1 | 9/2007 | Burton et al. |
| 2007/0254596 A1 | 11/2007 | Corson et al. |
| 2008/0240078 A1* | 10/2008 | Thubert et al. ............ 370/351 |
| 2008/0261639 A1 | 10/2008 | Sun et al. |
| 2008/0268892 A1 | 10/2008 | Hamdi et al. |
| 2009/0196180 A1 | 8/2009 | Bahl et al. |
| 2009/0247201 A1 | 10/2009 | Ye et al. |
| 2009/0279449 A1 | 11/2009 | Kneckt et al. |
| 2009/0303926 A1* | 12/2009 | Den Hartog et al. ....... 370/328 |
| 2010/0002608 A1 | 1/2010 | Goldhamer |
| 2010/0111066 A1 | 5/2010 | Mehta |
| 2010/0142463 A1 | 6/2010 | Hu |
| 2010/0165947 A1* | 7/2010 | Taniuchi et al. ........... 370/331 |
| 2010/0220643 A1* | 9/2010 | Qi et al. .................... 370/312 |
| 2011/0222493 A1 | 9/2011 | Mangold et al. |
| 2011/0250857 A1 | 10/2011 | Reial et al. |
| 2011/0250921 A1 | 10/2011 | Reial et al. |
| 2012/0077506 A1 | 3/2012 | Wietfeldt et al. |
| 2012/0225662 A1 | 9/2012 | Jo et al. |

FOREIGN PATENT DOCUMENTS

| | | |
|---|---|---|
| EP | 1 361 728 A2 | 11/2003 |
| EP | 1 703 701 A1 | 9/2006 |
| WO | 2010137004 A1 | 12/2010 |

OTHER PUBLICATIONS

Final Rejection for related U.S. Appl. No. 12/635,400 dated Oct. 9, 2012, pp. 1-33.

Office Action for related U.S. Appl. No. 12/815,620 dated Oct. 22, 2012, pp. 1-70.

Notice of Preliminary Rejection for corresponding Korean Patent Application No. 10-2013-7022699, dated Nov. 25, 2013, 7 pages (English Language Summary Included).

Office Action for related U.S. Appl. No. 12/635,086 dated Aug. 31, 2012, pp. 1-19.

Office Action for related U.S. Appl. No. 12/875,183 dated Aug. 9, 2012, pp. 1-100.

Office Action for U.S. Appl. No. 12/635,187 dated Dec. 7, 2011, pp. 1-27.

Substantive Examination Report Stage I for related Indonesian Patent Application No. W-00201104830 dated Jun. 19, 2013, 4 pages.

Office Action for related U.S. Appl. No. 12/396,789 dated May 11, 2012, pp. 1-32.

Office Action for related U.S. Appl. No. 12/635,400 dated Mar. 7, 2012, pp. 1-29.

Chinese Office Action with English language summary for corresponding Patent Application No. 201080029285.1, mailed Dec. 27, 2013, 9 pages.

Office Action for corresponding Chinese Application No. 201080029285.1, dated Sep. 5, 2014, 7 pages (English Language Summary Included).

Final Rejection for related U.S. Appl. No. 12/635,284 dated Jun. 4, 2012, pp. 1-39.

Office Action for Russian Application No. 2011152513, dated Mar. 27, 2013, pp. 1-9.

\* cited by examiner

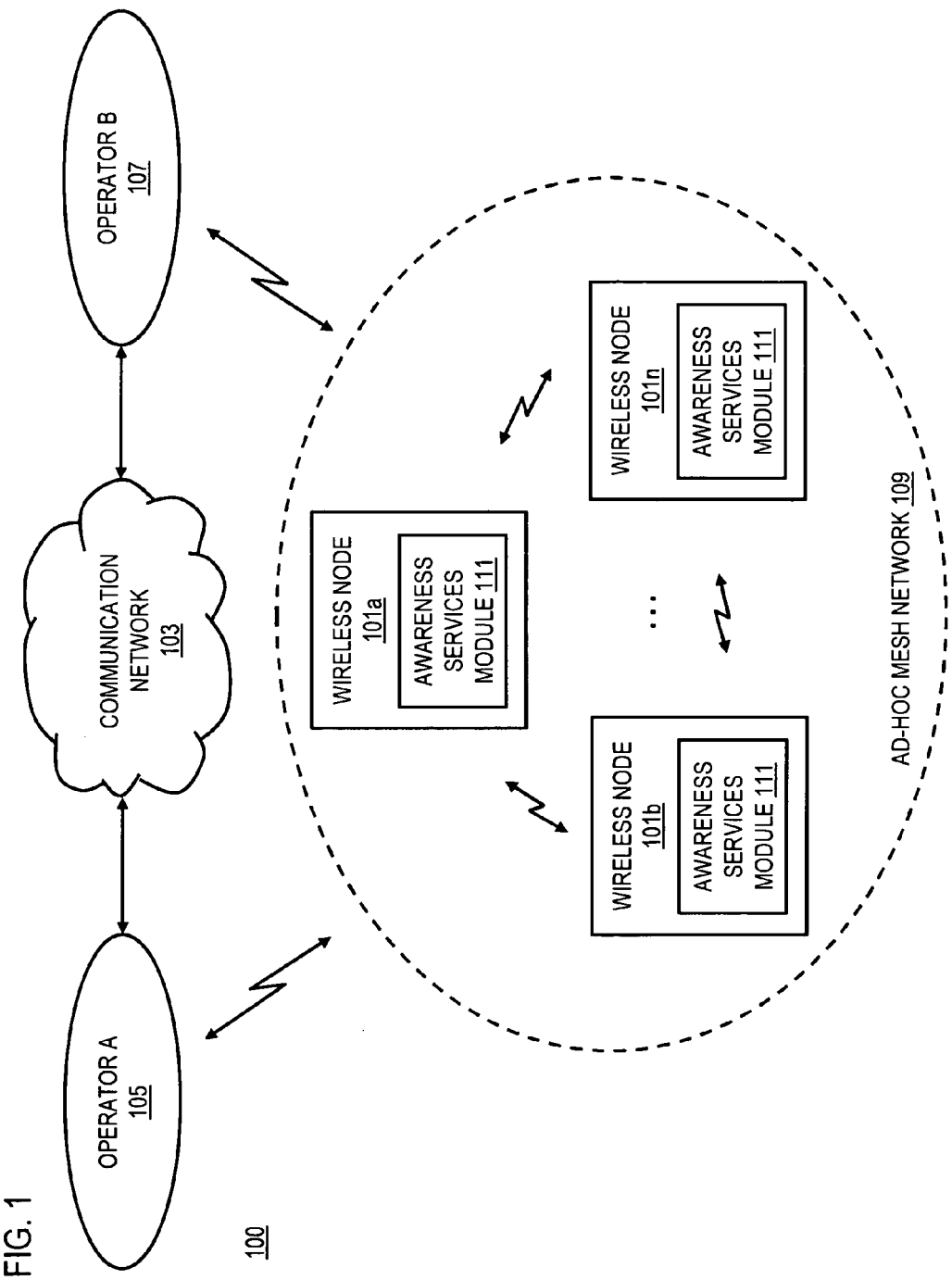

FIG. 2F

| NETWORK LAYER MESSAGE HEADER 281 |
|---|
| TX 282 (TRANSMITTER NID) |
| SRC 283 (SOURCE NID) |
| DST 284 (DESTINATION NID) |
| MSN 285 (MESSAGE SEQUENCE NUMBER) |
| HOP COUNT 286 |
| GEOGRAPHICAL LIMIT 287 |
| TEMPORAL LIMIT 288 |
| CONTEXT LIMIT 289 |

METHOD AND APPARATUS FOR ENGAGING IN A SERVICE OR ACTIVITY USING AN AD-HOC MESH NETWORK

BACKGROUND

Wireless (e.g., cellular) service providers and device manufacturers are continually challenged to deliver value and convenience to consumers by, for example, providing compelling network services, applications, and content. One area of development is the use of device-to-device communication networks and devices to automatically determine information and context about the local environment. However, technical challenges relating to power consumption, signaling overhead, security, and privacy have hindered such development.

SOME EXEMPLARY EMBODIMENTS

Therefore, there is a need for an approach for providing services or activities that use information and associated context in a local environment.

According to one embodiment, a method comprises discovering a location-based service by sending an anonymous flooding message including a query over an ad-hoc mesh network. The method also comprises receiving a reply from a neighboring wireless node over the ad-hoc mesh network. The reply includes a pointer to the discovered location-based service.

According to another embodiment, an apparatus comprising at least one processor, and at least one memory including computer program code, the at least one memory and the computer program code configured to, with the at least one processor, cause the apparatus to discover a location-based service by sending an anonymous flooding message including a query over an ad-hoc mesh network. The apparatus is also caused to receive a reply from a neighboring wireless node over the ad-hoc mesh network. The reply includes a pointer to the discovered location-based service.

According to another embodiment, a computer-readable storage medium carrying one or more sequences of one or more instructions which, when executed by one or more processors, cause an apparatus to discover a location-based service by sending an anonymous flooding message including a query over an ad-hoc mesh network. The apparatus is also caused to receive a reply from a neighboring wireless node over the ad-hoc mesh network. The reply includes a pointer to the discovered location-based service.

According to another embodiment, an apparatus comprises means for discovering a location-based service by sending an anonymous flooding message including a query over an ad-hoc mesh network. The apparatus also comprises means for receiving a reply from a neighboring wireless node over the ad-hoc mesh network. The reply includes a pointer to the discovered location-based service.

According to another embodiment, a method comprises receiving a flooding message including a query for discovering a location-based service over an ad-hoc mesh network. The method also comprises initiating transmission of a reply to the flooding message. The reply includes a pointer to the discovered location-based service.

According to another embodiment, an apparatus comprising at least one processor, and at least one memory including computer program code, the at least one memory and the computer program code configured to, with the at least one processor, cause the apparatus to receive a flooding message including a query for discovering a location-based service over an ad-hoc mesh network. The apparatus is also caused to initiate transmission of a reply to the flooding message. The reply includes a pointer to the discovered location-based service.

According to another embodiment, a computer-readable storage medium carrying one or more sequences of one or more instructions which, when executed by one or more processors, cause an apparatus to receive a flooding message including a query for discovering a location-based service over an ad-hoc mesh network. The apparatus is also caused to initiate transmission of a reply to the flooding message. The reply includes a pointer to the discovered location-based service.

According to yet another embodiment, an apparatus comprises means for receiving a flooding message including a query for discovering a location-based service over an ad-hoc mesh network. The apparatus also comprises means for initiating transmission of a reply to the flooding message. The reply includes a pointer to the discovered location-based service.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 1 is a diagram of a communication system capable of engaging in a service or activity using an ad-hoc mesh network, according to an exemplary embodiment;

FIG. 2F is a diagram of the data structure of a network layer message header, according to an exemplary embodiment;

DESCRIPTION OF PREFERRED EMBODIMENT

Figure 2A:
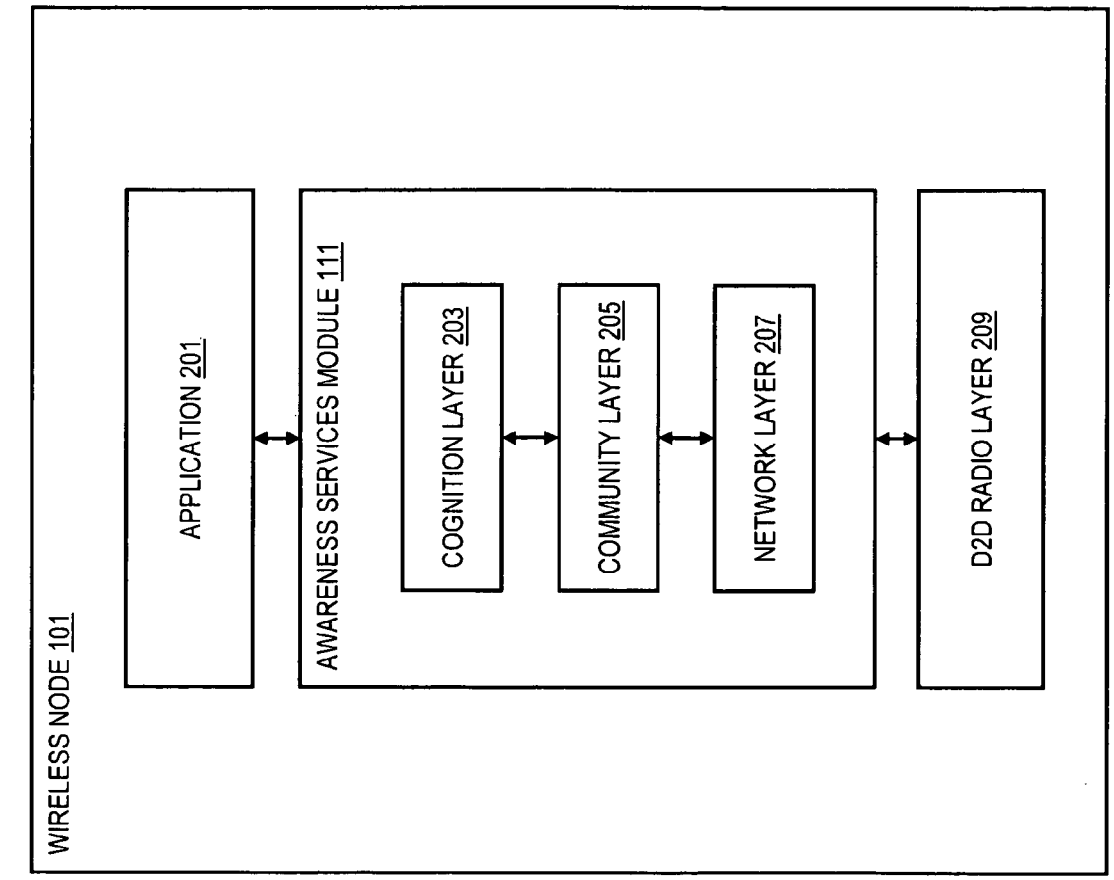
FIG. 2A is a diagram of the components of a wireless node including an awareness services module, according to an exemplary embodiment.

A method and apparatus for engaging in a service or activity using an ad-hoc mesh network are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term "awareness information" refers to any information and/or context about a local environment as well as the users and communication devices within the local environment. By way of example, awareness information can be used to support applications for creating social networks, determining presence, determining contexts associated with a device, advertising, searching for information, etc. Although various exemplary embodiments are described with respect to locating communities over an ad-hoc mesh network, it is contemplated that the approach described herein may be used within any type of communication system or network.

FIG. 1 is a diagram of a communication system capable of engaging in a service or activity using an ad-hoc mesh network, according to an exemplary embodiment. Information and context comprise "awareness information" that metaphorically equip a communication device with "radio eyes and ears" to continuously collect and exchange information with other devices in a local environment. However, development of a system for providing awareness information poses significant technical challenges, particularly in the areas of creating a network for sharing awareness information, locating and organizing awareness information, forming communities for sharing awareness information, managing power consumption for devices constantly engaged in sharing awareness information, developing applications to take advantage of the awareness information, maintaining the privacy and anonymity of users sharing awareness information, and preventing the proliferation of undesired messages (e.g., spam) over the network.

As shown in FIG. 1, a system 100 comprises one or more wireless nodes 101a-101n optionally having connectivity to a communication network 103 through either operator A 105 or operator B 107. The wireless nodes 101a-101n are any type of mobile terminal, portable terminal, or fixed terminal including mobile handsets, personal computers, stations, units, devices, multimedia tablets, Internet nodes, communicators, Personal Digital Assistants (PDAs), radio readable tags (e.g., near field communication (NFC) tags, radio frequency identification (RFID) tags), or any combination thereof. It is also contemplated that the wireless nodes 101a-101n can support any type of interface to the user (such as "wearable" circuitry, etc.).

In exemplary embodiments, the wireless nodes 101a-101n form an ad-hoc mesh network 109 for sharing awareness information. The ad-hoc mesh network 109 is, for instance, a connectionless and serverless device-to-device network (e.g., a mobile ad-hoc network (MANET)) created using short-range radio technology (e.g., wireless local area network (WLAN) or Bluetooth®). Within the ad-hoc mesh network 109, each wireless node 101 may be mobile and is within communication range of any number of other wireless nodes 101. Accordingly, the set of wireless nodes 101a-101n that is within communication range of any a particular wireless node 101 is transient and can change as the wireless nodes 101a-101n move from location to location.

As discussed previously, service providers and device manufacturers that are developing communication systems and networks for providing awareness information face many technical challenges. For example, current ad-hoc radios (e.g., WLAN and Bluetooth®) are designed for connectivity (e.g., connectivity via Internet protocol (IP)). However, in an "always on" environment such as the ad-hoc mesh network 109, it is not practical to have a large number of wireless nodes 101a-101n (e.g., mobile handset devices) "connected" by, for instance, IP to each other for extended periods of time because of power usage and scalability problems. Specifically, a multi-hop connection in a large ad-hoc network typically requires a significant amount of control signaling and power and can quickly deplete a mobile device's battery. Moreover, scalability can be a problem because current ad-hoc radios are typically limited in the number of connections and the related signaling that they can support at any given time. Another shortcoming of current ad-hoc radios is that they do not adequately protect a user's privacy because they expose the user's identity through a fixed network address (e.g., a media access control (MAC) address) associated with the user's device.

To address these problems, the system 100 creates the ad-hoc mesh network 109 for sharing awareness information in a connectionless fashion. As used herein, the term "connectionless" refers to the ability of a node (e.g. wireless node 101a) to send and of all surrounding nodes 101a-101n to receive awareness information without the need to send any prior control signaling. For example, sending awareness information using the transmission control protocol/IP (TCP/IP) over a WLAN ad-hoc is not connectionless because of the two-way TCP control signaling between the sending and receiving nodes used to establish the TCP connection. The awareness information is provided, for instance, in small anonymous messages that are exchanged by the wireless nodes 101a-101n automatically without user intervention. As used herein, the term "anonymous" means that it is not possible to infer the true identity of the sender from the message, unless the true identity is intentionally included in the message (e.g., by the user or another entity authorized by the user). The exchange of awareness information occurs as a broadcast message (i.e., a flooding message) from a wireless node 101 to neighboring wireless nodes 101 that are within range of the radio of the broadcasting wireless node 101. As neighboring wireless nodes 101 receive the broadcasted message, each receiving wireless node 101 may in turn rebroadcast the message to other neighboring wireless nodes 101. In this way, the originally broadcasted message propagates throughout the ad-hoc mesh network 109. In exemplary embodiments, the extent of the propagation may be limited by criteria such as distance, location, time, etc.

Unlike traditional systems, such messages are only for carrying awareness information and are not for transporting content (e.g., files or media containing voice, video, etc.) between two wireless nodes (e.g., wireless nodes 101*a* and 101*b*). Instead, the messages contain only pointers to the content or a small amount of data (e.g. presence or context information) to minimize the data traffic transported over the ad-hoc mesh network 109. The wireless nodes 101*a*-101*n* may then access the content using other communication channels (e.g., via IP through the communication network 103). In addition, the system 100 eliminates the problems associated with traditional methods for route establishment and maintenance (e.g., connection based communication protocols), such as maintaining and handing off connections as mobile devices move, and requiring high levels of network resources for maintaining connections in an environment with a high number or density of mobile devices. For example, the event of a wireless node 101 appearing/disappearing to/from the network does not generate any control signaling in the ad-hoc mesh network 109. Similarly, the system 100 creates routing information only when needed to route replies to queries back to the querying node. The routing information is generated by using the query messages alone (i.e. no control signaling is used for creating routing information). After the query and subsequent reply process is completed, the routes are forgotten. In other words, the query/reply process of system 100 provisions routes for a reply to provide awareness information on demand rather than pushing awareness information from one node 101 to another. In exemplary embodiments, both push (e.g., information is published over the ad-hoc mesh network 109) and pull (e.g., information is queried from other nodes 101*a*-101*n* of the ad-hoc mesh network 109) modes of disseminating awareness information are possible. In certain embodiments, it is contemplated that the pull mode of operation can be used instead of the push mode to help suppress potential spam messages.

Moreover, the system 100 optimizes the power consumption of wireless nodes 101 communicating over the ad-hoc mesh network 109 to enable always-on operation without seriously affecting the battery life of the wireless nodes 101. For instance, by utilizing only short awareness messages, by eliminating the need for any route maintenance signaling, by employing procedures to minimize transmission and reception of duplicative messages and by enabling an efficient sleep scheme for the short-range device-to-device radio used within each wireless node 101 (allowed by the low latency requirements typical of an awareness information network), the system 100 can potentially provide hundreds of hours (e.g., over 400 hours) of continuous operation of each wireless node 101 between battery charges in a mobile device. The system 100 could be seen as a "nervous system" between the mobile devices, where small messages ("nerve impulses") are continuously exchanged by the mobile devices ("neurons") in order to bring awareness to the user of a mobile device about the user's surroundings.

The system 100 also enables the development of new services and applications based on awareness information (e.g., social networking applications, location-based applications, application for determining presence, applications for determining context, advertising applications). In particular, the continuous and immediate nature of the awareness information with respect to local environment enables compelling new services. For instance, awareness information may be combined with the increasingly available storage and computing power in mobile devices (e.g., wireless nodes 101*a*-101*n*) to create a local semantic web, whereby local awareness information is created and searched for automatically by wireless nodes 101 within the ad-hoc mesh network 109. As used herein, the term "semantic web" refers to a system in which the information and messages shared with the system is understandable by the nodes 101 within the system. It is noted that establishing such a local semantic web using the system 100 overcomes two major problems blocking the development of a global semantic web: (1) lack of mechanism for providing semantic content on a large scale, and (2) lack of semantically aware search engines to help users find information in a semantic web. The system 100 can also be used for collaborative context calculation, publishing pointers to information or content, search for friends within a defined community, finding out what is going on and what kind of people are around a user, making the environment aware of the user, and other like applications.

The following are exemplary use-case scenarios for applications based on awareness information.

In a first use-case, the awareness information alerts a user to nearby people or places. For example, a user is visiting a new town when the wireless node 101*a* alerts the user that "Salvatore, a friend of your friend David is nearby." The user may then arrange to meet Salvatore to get a recommendation for sites to visit in the new town. In another example, a user is looking for a good restaurant in an unfamiliar neighborhood. An application based on awareness information may present a list of local restaurants ranked by the number of people currently eating in the restaurant that have the same food preferences as the user. Such a list can be collected based on queries and replies that contain anonymous information of people's food preferences.

In a second use-case, an application uses the awareness information to discover events near the user. For example, as a user passes a park, the wireless node 101*a* informs the user, based on messages exchanged between nearby devices, that "There is a Japanese culture festival in the Tea Garden Park; five members of your Kabuki community are there: Zen, Mi, Xia, Talo, and Chris." The user may then decide to attend the festival.

In a third use-case, an application provides location-based or context-based services using awareness information. For example, a wireless node 101*a* does not have positioning capabilities but nonetheless knows that it is in a grocery store based on anonymous awareness information from other nearby wireless nodes 101. It is contemplated that the grocery store may also place a node 101 in the store to provide such context information, possibly combined with other store specific information such as the address of the store's web page. The wireless node 101*a* then reminds the user to "Remember to buy dishwasher detergent" based on the user's location in a grocery store. The awareness information can also be the physical position information from a neighboring wireless node 101 that has the positioning capability. Sharing of positioning information with a neighboring node with such a capability can enable nodes 101 without such capability to offer navigational services.

In another example, a group of people are attending a meeting. The meeting invitation includes an identification code for that particular meeting that is stored in the mobile nodes 101 of the meeting attendees (e.g., the identification code may be stored in the calendar data). Using the principles set forth in this invention, the nodes 101 can exchange the meeting identification code over the ad-hoc mesh network 109 while attending the meeting. Comparing the exchanged identification code in a user's wireless device 101 can, for instance, establish whether the users was indeed at the meeting corresponding to the identification code. Such accurate social context knowledge can be used, for instance, to adapt the service or application behavior towards the user.

In a fourth use-case, an application provides for search of local information that changes rapidly and very specific to a local environment. The local information often does not reach traditional Internet search engines. For example, a user bought tickets to a concert, but discovers at the last minute that the user cannot attend. The user stores a string "Ticket to concert X at venue Y is available" into the awareness services module 111 of the user's wireless node 101. As a result, a nearby wireless node 101a, within a few street blocks away, that searches for tickets by sending query messages with a string "Ticket concert X" over the multi-hop ad-hoc mesh network 109, will receive the user's ticket availability message as an automatic reply.

In a fifth use-case, an application enables locally targeted advertising. For example, it is almost closing time for a local fresh fruit market. The merchants decide to publish an advertisement over the ad-hoc mesh network 109 that "Apples are 50% off for the rest of the day." The advertisement is available to users who live nearby the market. In another example, a user browses an advertisement for a new printer on a wireless node 101a. In the browsing activity, a code attached to the advertisement is stored in the awareness services module 111. Upon searching and finding such a code, a nearby electronics store sends the user an offer to sell the printer with a 10% discount.

In a sixth use-case, an application automatically creates an activity log based on the awareness information associated with a user. For example, the application records the people the user meets along with other awareness information such as when, where, context, etc. The user then meets a person while walking on the street. The person looks familiar but the user does not recall the person's name or how the user knows the person. The wireless node 101a running the application reports that the person's name is David and that the user met him at a soccer match one year ago in London.

In a seventh use-case, an application provides the capability to initiate local discussion threads and group chats over the ad-hoc mesh network 109. For example, the supporters of a football team form a community over the ad-hoc mesh network 109 wherein community members can send short text messages (e.g., of small enough size to be sent directly over the ad-hoc mesh network 109) that can be received and read only by the fan club community members of that particular team.

FIG. 2A is a diagram of the components of a wireless node including an awareness services module, according to an exemplary embodiment. FIG. 2A is described with respect to FIGS. 2B-2E which are diagrams of the components of an awareness services module, according to various exemplary embodiments. As shown in FIG. 2A, a wireless node 101 includes one or more components for sharing awareness information within the ad-hoc mesh network 109. It is contemplated that the functions of these components may be combined in one or more components or performed by other components of equivalent functionality. In this embodiment, the wireless node 101 includes an application 201 that uses awareness information to provide various services and functions including social networking, location-based services, presence information, context determination, advertising functions, etc. The application 201 may interact with the awareness services module 111 to obtain or share awareness information.

Figure 2B:
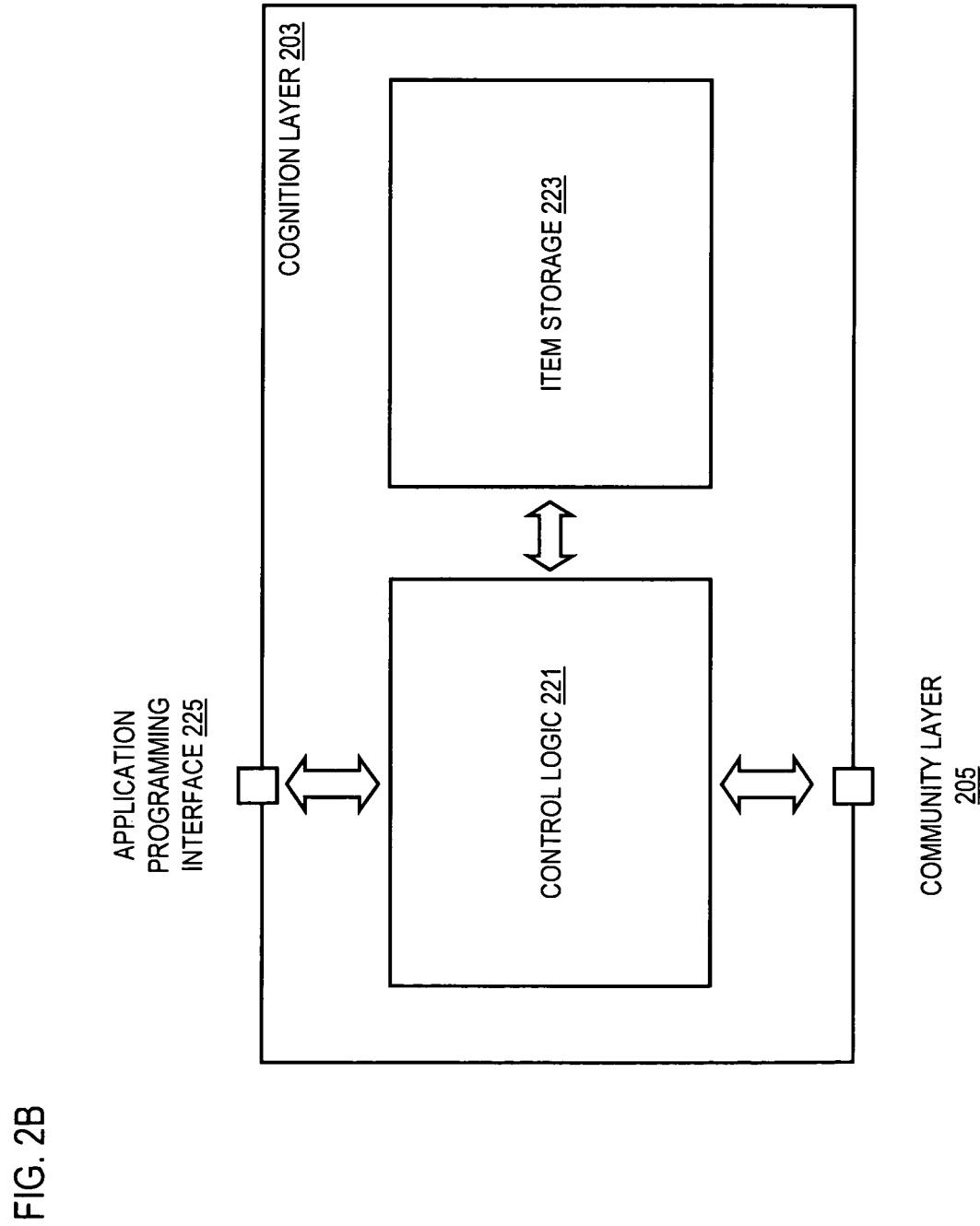
FIGS. 2B-2E are diagrams of the components of an awareness services module, according to various exemplary embodiments.

By way of example, the awareness services module 111 includes three layers: a cognition layer 203, a community layer 205, and a network layer 207. The cognition layer 203 is the highest control layer for sharing awareness information. As shown in FIG. 2B, the cognition layer 203 includes a control logic 221 and item storage 223. The control logic 221, for instance, provides the logic for creating, publishing, querying, and receiving awareness information over the ad-hoc mesh network 109. The control logic 221 can store the information that it either creates or receives in the item storage 223. It is contemplated that the item storage 223 may be of sufficient size to store all or a portion of the information that flows through the wireless node 101 over a configurable period of time (e.g., days, months, or years).

In exemplary embodiments, the control logic 221 enables querying and dissemination of awareness information by initiating the flooding of the query or information to neighboring wireless nodes 101 within the ad-hoc mesh network 109. For example, upon receiving a query, the wireless nodes 101 in the local neighborhood that have the queried information reply to the querying node automatically. In exemplary embodiments, the reply information is also automatically stored in the item storage 223 of each wireless node 101 through which the propagating reply passes. Moreover, the reply to a query may result in return of a pointer to specific content relevant to the query rather than the content itself under certain circumstances (e.g., when the specific content is large in size). It is contemplated that the reply may contain direct content if the content is relatively small (e.g., a few tens of bytes of information). By using a pointer, the system 100 minimizes the data traffic that flows through the ad-hoc mesh network 109. The user may then access the content via the pointer (e.g., a universal resource locator (URL) address, IP address) via a more appropriate communication protocol (e.g., IP) and/or means of communication (e.g. infrastructure networks). The receipt of the pointer (e.g., IP address) may automatically trigger the transfer of the content using, for instance, the communication protocol associated with the pointer. In the case of broadcasting or publishing information, any wireless node 101 through which the published information propagates may store the information in item storage 223 of the wireless node 101.

In other exemplary embodiments, awareness information can also be published directly by flooding an awareness message. Such a push mode for the dissemination of awareness information can be used to support some applications (e.g. advertising or group chatting) over the ad-hoc mesh network 109.

It is recognized that privacy and anonymity may be of concern to users of the system 100. Accordingly, the control logic 221 provides mechanisms for ensuring privacy and anonymity. For example, the control logic 221 can prevent the transmission of intimate information when the number of neighboring wireless nodes is small to prevent the possibility of inferring identity. As used herein, the term "intimate information" refers to information directly related to the user, e.g., the user's habits, tastes, or preferences (musical preferences, favorite restaurants, etc.).

The control logic 221 may also periodically broadcast decoy queries and replies to make tracking an individual wireless node 101 more difficult. Since an outside observer does not know the authentication key associated with a community, the observer cannot distinguish a valid message from a fictitious one. Accordingly, by observing decoy messages, the observer is likely to detect presence of a private community when there is not one. Additionally, the control logic 221 enables to user to define filters for incoming information (e.g., filter advertisements) and how these filters would work (e.g., ignore the information completely, relay the information but do not store, etc.). It is also contemplated that the user can direct the control logic 221 to control the user's visibility on the ad-hoc mesh network 109 (e.g., no visibility, visible only to a certain community or other user) to maintain privacy. As another mechanism for protecting privacy, the control logic 221 can interact with the community layer 205 to anonymize a specific message and corresponding identifiers as described below with respect to the community layer 205.

Because one of the goals of the system 100 is to provide a mechanism for anonymous spreading of awareness information, it is recognized that undesired or unsolicited messages (e.g., spam messages) may become a problem. To address this problem, the control logic 221 may obtain, for instance, information from the lower system layers of the awareness services module 111 about the traffic load and current average power consumption. If the traffic load is medium or high (meaning that also power consumption related to system 100 is medium or high) restrictions may be set for the frequency at which flooding messages are sent by the control logic 221. It is also contemplated, that the neighboring peer nodes 101 can be configured to not forward any flooding messages originating from a node 101 neglecting such message restrictions.

The cognition layer 203, together with the community layer 205, provide an application programming interface (API) 225 to enable an application 201 to access the functions of the control logic 221 and the item storage 223. In exemplary embodiments, the API 225 enables application developers to have uniform and easy access to functions related to sharing awareness information over the ad-hoc mesh network 109. It is contemplated that the API 225 is extensible to accommodate any application designed to access or use awareness information. The applications in the various nodes 101 do not have to be the same or mutually compatible. It is sufficient that the applications use the API correctly to be able to publish and search awareness information in the surrounding nodes 101.

The cognition layer 203 also has connectivity to the community layer 205. The community layer 205 controls the formation and cataloging of communities of wireless nodes 101 within the ad-hoc mesh network 109. By way of example, a user may create any number of communities for sharing awareness information. It is contemplated that a community may be either a peer community (e.g., any wireless node 101 may join), a personal community (e.g., a wireless node 101 may join only if invited), or the open local community that consists of all nodes in the local neighborhood. In exemplary embodiments, the messages that traverse between the wireless nodes 101 within the ad-hoc mesh network 109 belong to one of these three community types. Communities can either be private (messages are encrypted) or public (no encryption used). In exemplary embodiments, membership and status in a community affect how the wireless node 101 shares awareness information (see the discussion with respect to FIG. 2G for additional details of community membership).

Figure 2C:
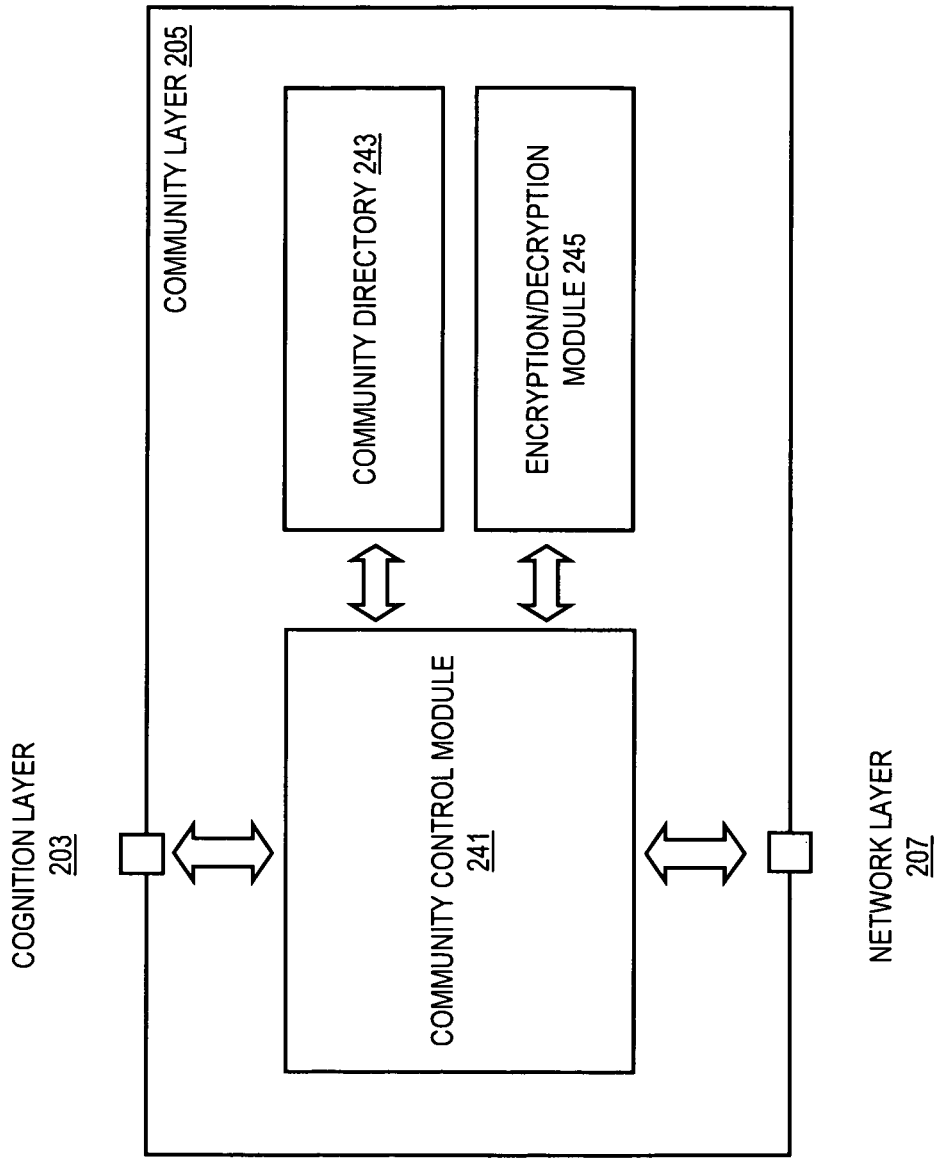

Furthermore, a community may be created for any purpose or duration (e.g., a permanent work community, a permanent community of friends, a temporary community of concert goers lasting only the duration of the concert). As shown in FIG. 2C, the community layer 205 includes a community control module 241, a community directory 243, and an encryption/decryption module 245. The community control module 241 provides the logic for creating, joining, managing (e.g., updating membership, configuring settings and preferences, setting privacy policies), and deleting communities. The module 241 also provides part of the API 225.

In exemplary embodiments, the community control module 241 assigns a unique community identification number (CID) to each community for use within the ad-hoc mesh network 109. The control module 241 can also generate authentication keys K associated with the CID to, for instance, authenticate users who wish to join the community or authenticate messages directed to the community. For example, a wireless node 101 may invite another wireless node 101 to join a community by transferring the CID and authentication keys associated with the community to the other wireless node 101. It is contemplated that the transfer of the CID and corresponding authentication key may occur using short range radio or using another secure mechanism (e.g., short message service (SMS) or electronic mail). It is noted that both peer and personal communities use a CID and corresponding K, whereas the open local community either can use a predetermined value for CID (e.g., zero) or does not use the CID at all.

To ensure privacy (as discussed above), the community control module 241 interacts an encryption/decryption module 245 to anonymize the CID when including the CID in messages over the ad hoc mesh network 109. For example, a wireless node 101 may direct a query to a specific community using an anonymized CID (e.g., a pseudonym) associated with the community in lieu of the actual CID. In exemplary embodiments, multiple anonymized CIDs may be used to represent a single community. In this way, it is more difficult to identify queries corresponding to a particular community by monitoring traffic within the ad hoc mesh network 109. From the perspective of an outside observer, the anonymized CIDs look random. In addition, the encryption/decryption module 245 may encrypt or decrypt message data using, for instance, a temporary key that is periodically derived from the authentication key K associated with the CID. These measures hinder the discovery of the CID by outsiders that do not have the authentication key. By way of example, the community layer 205 inserts a special header into the messages that it receives from the cognition layer 203. The special header, for instance, contains a list of anonymized community identifiers corresponding to the communities to which the message is relevant.

Figure 2D:
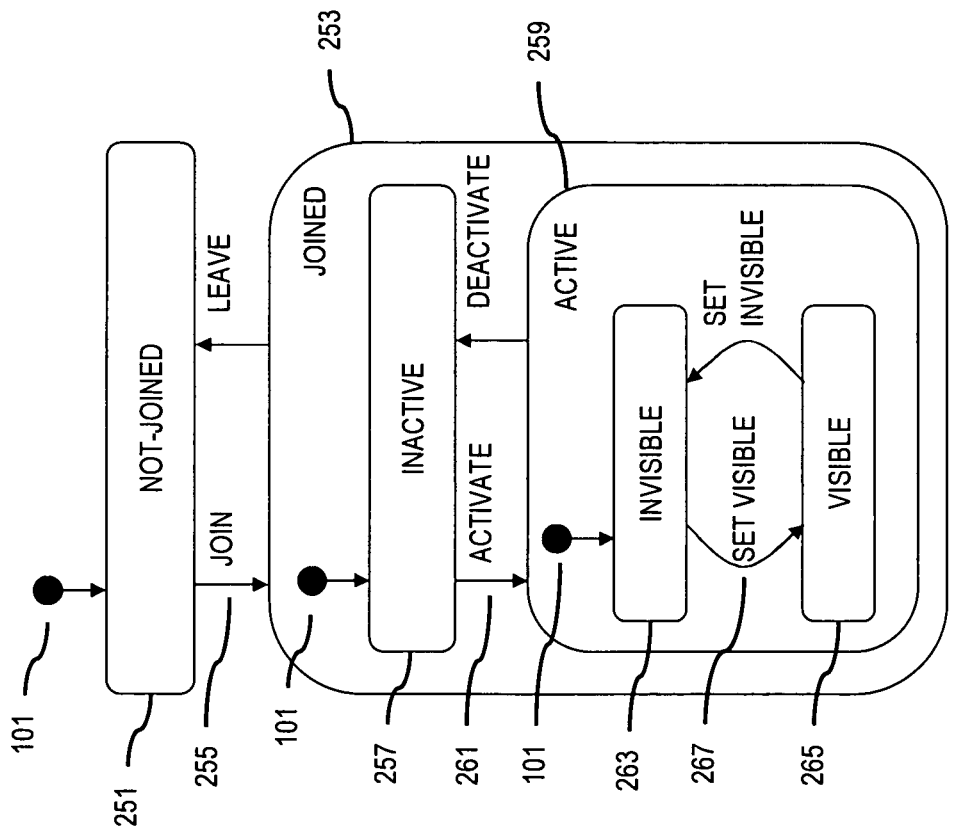

FIG. 2D is a state diagram of the effect of community membership and status on sharing awareness information, according to an exemplary embodiment. As shown in FIG. 2D, a wireless node 101 may be in either one or two states (e.g., a not-joined state 251 and a joined state 253) with respect to membership in a community within the ad-hoc mesh network 109. The application 201 of wireless node 101 issues, for instance, a command 255 to either join or leave a community to transition between the not-joined state 251 and the joined state 253. When the wireless node 101 is in the not-joined state 251 with respect to a community, the wireless node 101 has no information (e.g., CID and associated authentication keys K) about the community and cannot access messages directed to the community. When the wireless node 101 is in the joined state 253, the community layer 205 receives the CID and possibly one or more authentication keys associated with the community. In one embodiment, authentication keys are provided when membership in the community is by invitation or otherwise restricted (e.g., when the community is a personal community or a private community). Accordingly, the community layer 205 will be able to encrypt outgoing community specific messages and to decrypt incoming community specific messages.

When the wireless node 101 is in the joined state 253, the wireless node 101 may also be in either an inactive state 257 or an active state 259. To transition between the inactive state 257 and the active state 259, the application 201 may issue a command 261 to either activate or deactivate the joined state 253 via the application programming interface 225. When the wireless node 101 is in the inactive state 257, the community layer 205 abandons the message even though it is a member of the community. In certain embodiments, the wireless node 101 may also be invisible to other members of the community while in the inactive state 257. For example, the wireless node 101 may enter the inactive state 257 when it temporarily does not want to receive or share information with the community. When the wireless node 101 is in the active state 259, the community layer 205 encrypts and decrypts community messages as usual for private communities, and enables all outgoing and incoming community specific messages for public communities (e.g., communities with no restrictions on membership).

Within the active state 259, the wireless node 101 may also be in either an invisible state 263 or a visible state 265. To transition between the invisible state 263 and the visible state 265, the application 201 issues a command 267 to set either the visible or invisible state. When in the invisible state 263, the community-specific identity (e.g., a user alias) associated with the wireless node 101 cannot be queried by other members of the community. For example, in the invisible state 263, the community layer 205 continues to receive and send community messages without its identity known to other community members. When in the visible state 265, the identity of the wireless node 101 can be queried by other members of the community.

In various embodiments, the community directory 243 of the community layer 205 maintains, for instance, information on the communities that the user has joined. Such information contains, at least, the community identification (CID). Additionally, it may contain public and/or private authentication keys (K) of the joined communities and a list of anonymized community identifiers for each community. The community control module 241 may periodically recalculate the list of anonymized CIDs. By way of example, the community layer 205 inserts a header into the message it receives from the cognition layer 203. The header contains, for instance, a list of anonymized community identifiers identifying the communities to which the message is relevant.

It is contemplated that a special personal community can be reserved for tracking new bonds or relationships created between users. Consider, for example, that user A meets user B for the first time and wants to create a radio bond between the mobile devices corresponding to each user. In one embodiment, user A can initiate the creation this bond with user B by transferring to user B (e.g., by using a secure transfer mechanism) the CID and the public K of user A's personal "new bonds" community. Similarly, user B may give user A similar credentials corresponding to user B's "new bonds" community. Once the credentials are exchanged and the bond has been created, user A may find user B over the ad-hoc mesh network 109 by searching for members of user A's "new bonds" community. In other words, with a simple search of a single community, user A can search for all the people in user A's local neighborhood with whom user A has created a bond. This requires that a high number of community CIDs and Ks can be stored in the community directory 243. Also, an effective lookup of the community directory must be provided. There are many existing and good solutions for such efficient lookup.

As the user creates new bonds, the number community CIDs and Ks stored in the user's community directory 243 can grow quite large. Accordingly, to enable effective search of a large number of communities, the community layer 205 may generate a special community search message to initiate the search. For example, the special community search message contains, at least in part, a list of anonymized community identifiers corresponding to the communities to be searched. To protect the privacy, the community layer 205 can generate a new set of anonymized community identifiers for each community search message. If the community layer 205 finds a match to any of the anonymized community identifiers in any of the neighboring nodes 101 that receives the search message, the community layer 205 generates a reply message that may contain the alias of the user in that community or other community specific information. The reply message may be encrypted with the encryption key of the community.

Figure 2E:
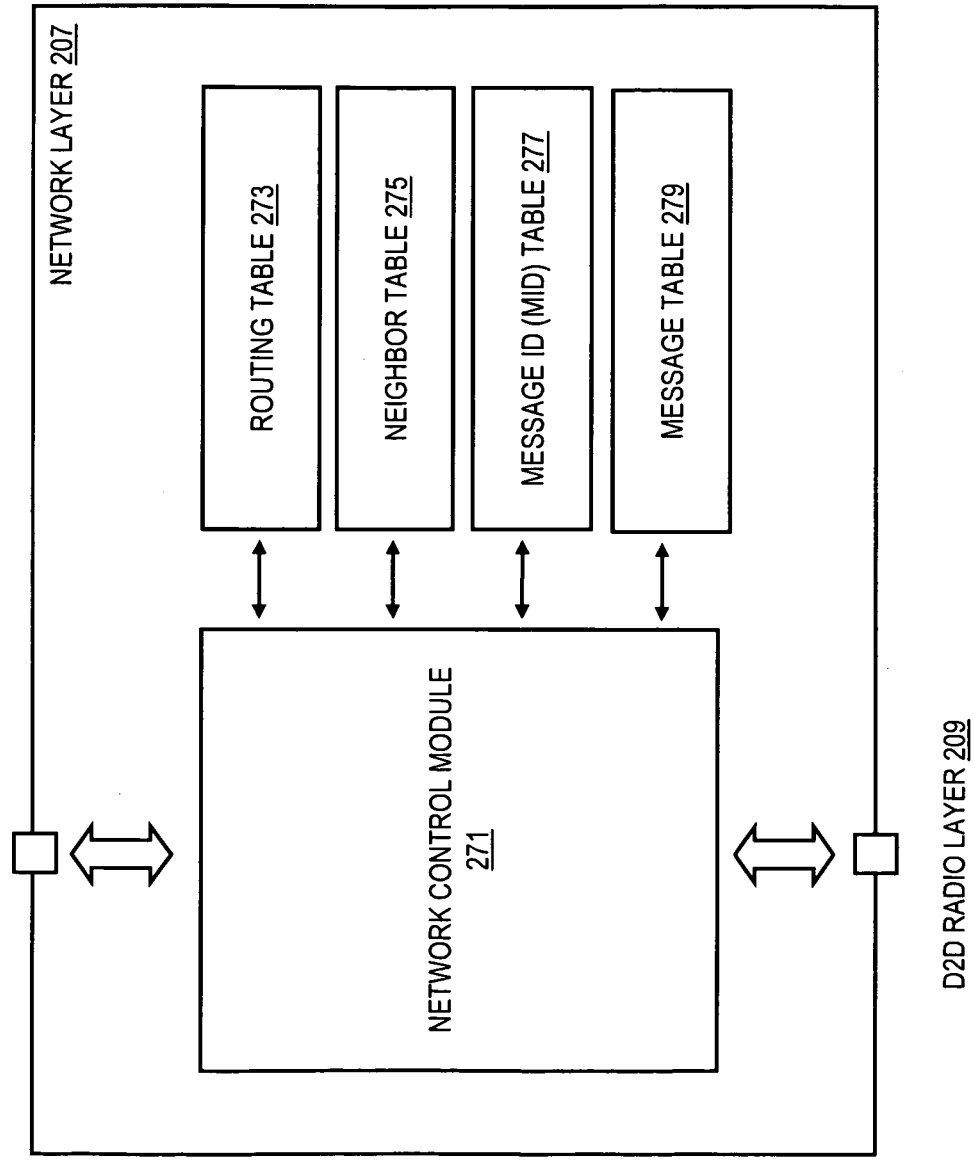

As shown in FIG. 2C, the community layer 205 has connectivity to the cognition layer 203 above and the network layer 207 below. The network layer 207 manages the rebroadcasting of received flooding messages and the routing of the unicast (typically reply) messages received by the wireless node 101. FIG. 2E depicts a diagram of the components of the network layer 207, according to an exemplary embodiment. The network layer 207 includes a network control module 271, routing table 273, neighbor table 275, message identification (MID) table 277, and message table 279. The network control module 271 directs the broadcasts of messages and information by managing and updating the routing table 273, neighbor table 275, MID table 277, and message table 279. In certain embodiments, the network control module 271 may also assist in protecting the privacy and anonymity of users by periodically changing the network layer identification associated with the wireless node 101. It is noted that making such a change in the network layer identification between queries does not cause routing problems for replies because the routing information is recreated by each query in the ad-hoc mesh network 109.

In exemplary embodiments, the network layer 207 may insert a header into messages it receives from the community layer 205 to, for instance, direct flooding and routing of the received messages. The structure of this network layer message header 281 is discussed with respect to FIG. 2F. FIG. 2F is a diagram of the data structure of a network layer message header, according to an exemplary embodiment. As shown, the message header 281 contains the following fields: (1) a TX field 282 to identify the transmitter node ID (NID) of the last transmitting node 101; (2) a SRC field 283 to identify the source node ID of the node 101 that originated the message; (3) a DST field 284 to identify the destination source ID of the intended recipient of a unicast (reply) message (e.g., this field is give a value of zero when the message is a flooding messages); (4) a MSN field 285 to identify the message sequence number assigned by the source node; and (5) a hop count field 286 that is incremented by one by each node 101 that transmits the message. In certain embodiments, the message header 281 may also contain the following optional fields: (6) a geographical limit field 287 to designate the extent of the physical over which the message is intended to propagate (e.g., the geographical limit field 287 may contain a geographical position of the source node and a maximum flooding radius from that position); (7) a temporal limit field 288 (e.g., the temporal limit field 288 may contain the time when the message becomes obsolete and should be dropped); and (8) a context limit field 289 that defines the context beyond which the message is not intended to propagate (e.g. a message related to a particular concert is not intended to extend beyond the concert venue).

Returning to FIG. 2E, the network layer 207 also contains a routing table 273. In exemplary embodiments, the routing table 273 contains a listing of the node identification number (NID) of the originating wireless node 101 (e.g., source NID) and the NIDs of the last known transmitters of the message. The purpose of the routing table is to enable the routing of the reply messages (e.g., unicast messages) back to the querying node that originated the query through a flooding message. As the message propagates through the ad-hoc mesh network 109, each subsequent wireless node 101 that receives the message adds the NID of the last transmitter to the routing table to record the next hop neighbor towards the source node. The source node is marked as the destination node (DST) in the routing table. Also the message sequence number of the message is recorded. The update of the routing table 273 is coordinated by the network control module 271. As shown in Table 1, the routing table 273 lists the destination NID, the transmitter NIDs associated with wireless nodes 101 that have rebroadcasted a message and the MSN of the message.

TABLE 1

| Destination NID | Transmitter NIDs | Message Sequence Number |
|---|---|---|
| $DST_1$ | $TX_{11}, TX_{12}, \ldots, TX_{1M}$ | $MSN_1$ |
| $DST_2$ | $TX_{21}, TX_{22}, \ldots, TX_{2N}$ | $MSN_2$ |
| $\ldots$ | $\ldots$ | |
| $DST_S$ | $TX_{S1}, TX_S, \ldots, TX_{ST}$ | $MSN_S$ |

The neighbor table 275 contains a list of the neighboring wireless nodes 101 and an estimate of their relative radio distance (see Table 3). It is contemplated that the observed signal strength together with the known transmitting power of a neighboring wireless node 101 is an indicator of the proximity of the wireless node 101 and can be used to calculate the relative radio distance. The relative radio distance of the node from which the message was last received is then used as a criterion for whether or not the wireless node 101 retransmits a received message. For instance, a higher signal strength indicates closer proximity to the wireless node 101. The network control module 271 monitors the signal strengths of neighboring nodes 101 as the module 271 receives messages from nearby devices and uses it to estimate the relative radio distance (e.g., proximity of the transmitting node 101). It is also contemplated that the network control module 271 may use any other mechanism for estimating the relative radio distance of neighboring nodes (e.g., estimating location using global positioning satellite receivers or other positioning techniques).

In certain embodiments, the network control module 271 uses the proximity information to direct the routing and transmission of messages over the ad-hoc mesh network 109. For example, the system 101 can reduce the potential for overloading the ad-hoc mesh network 109 by implementing a smart flooding scheme whereby only a few nodes 101 retransmit a flooding message. Whether a node 101 retransmits a flooding message can be dependent on the relative distance group (e.g., "very near", "near", or "far") to which the node 101 that is the transmitter of the message belongs. More specifically, if the transmitting node 101 is in the "far" or "near" group, the receiving node 101 can retransmit the flooding message. If the transmitting node 101 is in the "very near" group, the receiving node 101 does not retransmit the flooding message. For each broadcast message received from a node in either the "far" or "near" group, the network control module 271 assigns a random delay time for relaying or rebroadcasting. The delay period, for instance, exhibits a distribution function based on the estimated relative radio distance as a way to randomize the delay period before transmission. The distribution should be chosen in such a way that the random delay is larger for those nodes that are "near" than for those that are "far." This favors, for instance, nodes 101 that are further away to relay the flooding message forward, which results in better flooding efficiency (smaller total number of transmissions). The use of a random delay time also prevents the unintended synchronization of message broadcasts as the message propagates over the ad-hoc mesh network 109. For example, unintended synchronization of the message broadcasts may result in too many nodes 101 sending broadcasting (i.e., flooding) messages over the ad-hoc mesh network 109 at exactly the same time. Additionally, the delay time provides an opportunity for the network control module 271 to monitor and count rebroadcasts of the message by other neighboring wireless nodes 101.

TABLE 2

| Transmitter NID | Relative Radio Distance |
|---|---|
| $TX_1$ | $D_1$ |
| $TX_2$ | $D_2$ |
| $\ldots$ | $\ldots$ |
| $TX_T$ | $D_T$ |

The MID table 277 contains a list of received messages. As the wireless node 101 receives messages from neighboring nodes over the ad hoc mesh network 109, the network control module 271 uses the MID table to check whether the message has been received previously by, for example, comparing the MIDs in the MID table 277 to that of the received message. The MID table 277 also contains a flag indicating whether a message has been transmitted by the node 101 and the time when the entry was last updated. In exemplary embodiments, the MID is the tuple (SRC, MSN), where SRC is the NID of the source node and MSN is a message sequence number assigned by the source node. In this way, the MID is a unique identifier of each message that propagates in the network 109. The network control module 271 makes an entry in the MID table 277 for all new messages that it receives. If the message has been scheduled for transmission, the module 271 increments the message counter in the message table (see Table 4).

TABLE 3

| MID | Sent flag | Time of reception |
|---|---|---|
| $(SRC_1, MSN_{11})$ | "SENT" | $t_{11}$ |
| $(SRC_1, MSN_{12})$ | "NOT SENT" | $t_{12}$ |
| $\ldots$ | $\ldots$ | $\ldots$ |
| $(SRC_2, MSN_{21})$ | "NOT SENT" | $t_{21}$ |

The message table 279 contains messages that the network control module 271 has scheduled to transmit. For example, as the node 101 receives a flooding message that the network control module 271 schedules for transmission, the module 271 updates the message table to include the message in the message table 279. Each entry in the message table 279 contains the message itself, the time when the message is scheduled to be sent, and the number of receptions of the same message by the node 101 (see Table 4). In exemplary embodiments, a message is not replayed over the ad-hoc mesh network 109 if the number of times the message has been received exceeds a predefined limit. For example, a message has the initial count of 0. In this example, as a wireless node 101 in the neighborhood is observed to transmit the message, the message count associated with the message is increased. When the maximum message count is reached, the network control module 271 removes the message from the message table 279. The transmitter of each message is also associated with an estimated relative radio distance (D) indicating whether the transmitting node is within close proximity of the wireless node 101 (e.g., transmitting node 101 is in the "very near" relative radio distance group) or far from the wireless node 101 (e.g., transmitting node 101 is in the "far" relative radio distance group). If the relative radio distance associated with the transmitting node indicates that the transmission of the message occurred "very near," the wireless node 101 would not have to relay the message because it is assumed, for instance, that most of the other neighboring wireless nodes 101 have already received the same message. By taking into account the relative radio distances of neighboring nodes, the described smart flooding functionality leads to, on average, each flooding message being received for a few times by each node 101 independent of the node density. The number of times a message is received by any one node 101 affects the scalability of the network 109.

If the received message, however, is a unicast reply message that was addressed to the receiving node 101, the network control module 271 checks whether the destination node 101 can be found in the routing table 273 (e.g., can be found from the destination field in the reply message, or obtained from the source field of the query by the replying node). If found, the routing table entry will give the NID of the neighboring node to which the reply message will be sent in the next opportunity. If the unicast transmission is not successful, the next entry for the same DST will be used as the next try. If the received message is a unicast reply message that was not addressed to the receiving node, and no acknowledgment from the intended receiver node was heard, the node will store the message in the message table 279 for scheduled retransmission. It is noted that unicast messages or acknowledgement messages that are not addressed to the node 101 are normally received D2D radio layer 209 (see discussion of the D2D radio layer 209 below) but not by the awareness services module 111. However, under certain circumstances, the D2D radio layer 209 can provide such messages to the awareness services module 111 to schedule for retransmission. For example, if no successful unicast of the same message is observed by the time when the message is scheduled to be transmitted, the node 101 will transmit the unicast or acknowledgement message to the intended recipient found from the routing table 273 associated with the message. In this way, the nodes 101 that are not the intended recipients of the reply messages can assist in routing the message forward towards the correct destination.

TABLE 4

| Message | Time to send | Received msg count |
|---------|--------------|--------------------|
| $MSG_1$ | $t_1$ | $C_1$ |
| $MSG_2$ | $t_2$ | $C_2$ |
| ... | ... | ... |
| $MSG_M$ | $t_M$ | $C_M$ |

As shown in FIG. 2A, the awareness services module 111 has connectivity to a device-to-device (D2D) radio layer 209. The D2D radio layer 209 enables the formation of the ad-hoc mesh network 109 and sharing of awareness information using, for instance, short range radio technologies such as WLAN and Bluetooth®. It is contemplated that the D2D radio layer 209 may use any wireless technology for communication between devices over short ranges. The radio technology, for instance, enables each wireless node 101 within the ad-hoc mesh network 109 to broadcast messages in a connectionless way to the neighboring nodes 101 that are within radio range. As used herein, the term "connectionless" means the wireless nodes 101 need not use two-way signaling to establish a communication channel before broadcasting a message. In exemplary embodiments, the D2D radio layer 209 may include multiple radios using one or more different technologies or protocols (e.g., WLAN and Bluetooth® simultaneously). A wireless node 101 configured with multiple radios may act as a gateway node to span two or more sub-networks serviced by the different wireless technologies. In this way, messages broadcast on one sub-network may be propagated to another sub-network.

Figure 2G:
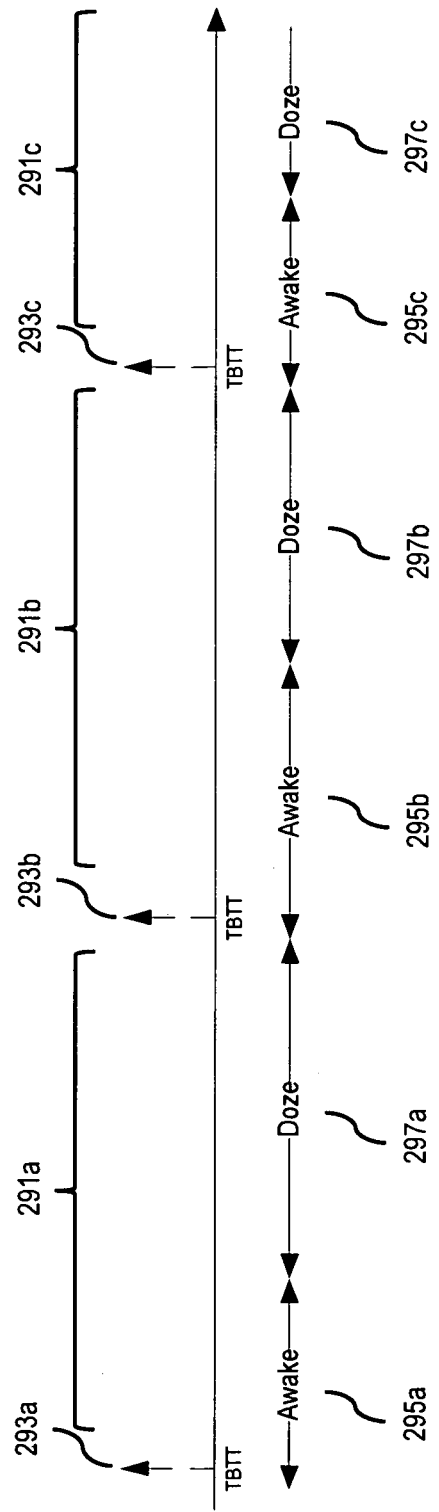
FIG. 2G is a diagram depicting a power saving scheme of a device-to-device radio layer, according to an exemplary embodiment.

FIG. 2G is a diagram depicting a power saving scheme of a device-to-device radio layer, according to an exemplary embodiment. The small amount of awareness data as well as the low latency requirements of the system 100 enables the operation of the D2D radio layer 209 in a way that leads to low power consumption. As shown in FIG. 2G, the D2D radio layer 209 may have beaconing periods 291a-291c delineated by target beacon transmission times (TBTTs) 293a-293c. In exemplary embodiments, the D2D radio layer 209 may operate in a time-synchronized manner and utilize only a fraction of the time for active communication (e.g., during awake periods 295a-295c). During the rest of each beaconing period 291, the D2D radio layer 209 is in, for instance, a power-saving or dozing mode (e.g., during doze periods 297a-297c). For example, each beaconing period 291 can be on the order of hundreds of milliseconds and each awake period 293 only a few milliseconds, leading to effective radio utilization of approximately one percent. It is contemplated that for situations, where the number of nodes 101 is very large (such as during mass events), time-wise radio utilization can increase up to 100 percent momentarily (e.g., awake period 293 equals active transmission period 291). At times of low traffic (for example at night), the radio utilization can be decreased to, for instance, 0.1 percent, by utilizing every tenth awake period 293 while still maintaining synchronization.

Figure 9:
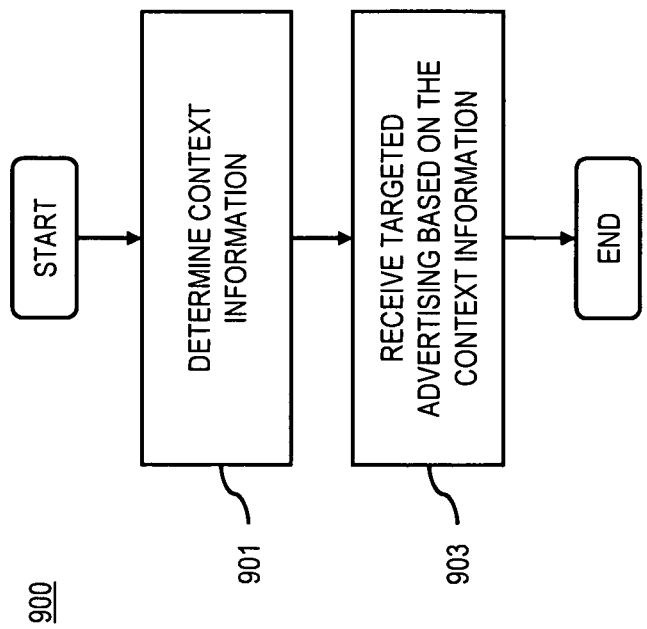
FIG. 9 is a flowchart of a process for providing a service for targeted advertising, according to an exemplary embodiment.

In exemplary embodiments, the low latency requirements also enable saving power in the host processor (e.g., as depicted in FIG. 9). For illustration, the following description refers to the components of exemplary chip set of FIG. 9. The D2D radio layer 209 is typically implemented in the ASIC module 909, whereas the functionalities of the awareness services module 111 can be implemented either in the ASIC 909 or the processor 903. If the functionalities of the awareness services module 111 are implemented in the processor 903, power consumption is reduced by, for instance, having ASIC 909 wake up the processor 903 as infrequently as possible. By way of example, the periodic operation of the D2D radio layer 209 explained above enables the ASIC 909 to collect all messages and send them to the processor 903 at a frequency of once per active transmission period 291. The processor 903 then processes all received messages and calculates new messages to be sent for the next active transmission period 291. The processor 903 then sends the messages to the ASIC 909 for transmission. Using this process, a flooding message can make one hop (e.g., travel from one node 101 to another node 101) per period 291, which is fully acceptable for awareness information. In contrast, potential delays of hundreds of milliseconds are not possible, for example, for voice traffic, and these kinds of power savings cannot therefore be achieved in other communication systems transporting delay-sensitive traffic.

Figure 3A:
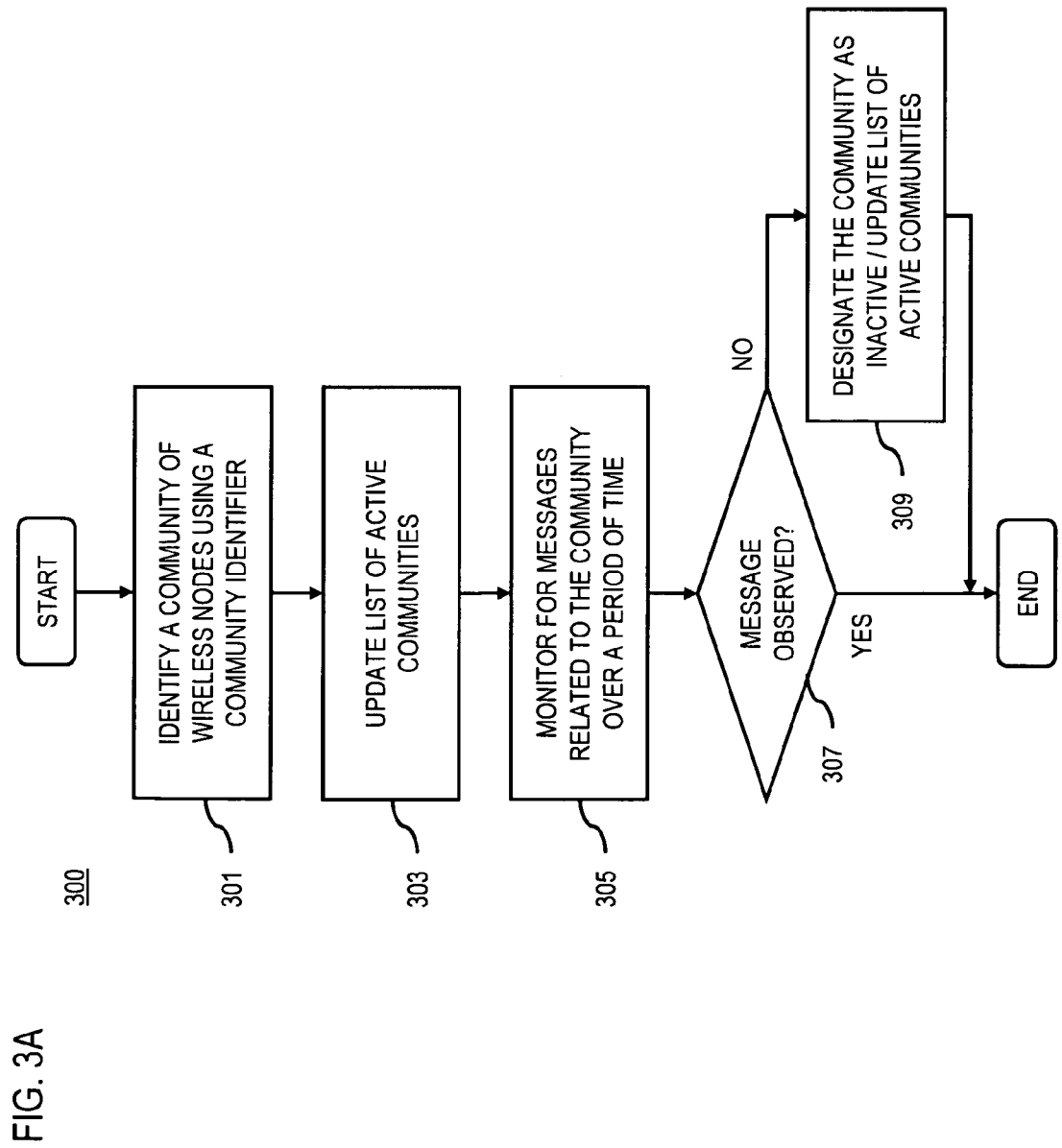
FIGS. 3A-3D are flowcharts of processes for locating communities and community members over an ad-hoc mesh network, according to various exemplary embodiments.

FIGS. 3A-3D are flowcharts of processes for locating communities and community members in the local neighborhood over an ad-hoc mesh network, according to various exemplary embodiments. FIG. 3A is a flowchart for locating active communities over the ad-hoc mesh network 109 and updating a list of the active communities that are visible to a wireless node 101. In one embodiment, the awareness services module 111 performs the process 300 of FIG. 3A and is implemented in, for instance, a chip set including a processor and a memory as shown in FIG. 9. In step 301, the awareness services module 111 identifies one or more communities of wireless nodes 101 by using, for instance, community identifiers (CIDs) corresponding to the one or more communities. In exemplary embodiments, each CID is associated with one or more authentication keys for authenticating members and messages transmitted within the corresponding community. The CIDs and associated keys are stored by the awareness services module 111 in, for instance, the community directory 243 and may be provided to wireless nodes 101 that are members of the community in advance using a secure communication channel over the ad-hoc mesh network 109 or the communication network 103. CIDs and keys that are created subsequently may also be provided using a secure communication channel over either the ad-hoc mesh network 109 or the communication network 103.

By way of example, the awareness services module 111 can use the CIDs to locate and identify communities that are active (e.g., transmitting or receiving community messages) among one or more neighboring wireless nodes 101 by (1) passively monitoring messages directed towards one or more communities over the ad-hoc mesh network 109 using the process described with respect to FIG. 3B below, (2) actively searching for one or more communities using a community search message as described with respect to FIG. 3C below, and/or (3) actively searching for one or more members of the communities using a member search message as described with respect to FIG. 3D. The awareness services module 111 then updates a list of active communities based on the identification (step 303). For example, the list of active communities includes those communities to which the wireless node 101 belongs (e.g., communities that are private such as a community of personal friends) and those communities that are public and open to all nodes 101 (e.g., a general community of all wireless nodes on the ad-hoc network 109 in which system wide messages may be exchanged).

In exemplary embodiments, the awareness services module 111 is continuously updating the list of active communities by, for instance, monitoring for messaging traffic over the ad-hoc mesh network 109 related to one or more of the active communities (step 305). More specifically, the awareness services module 111 tracks whether there are any messages originating from or directed to one or more of the active communities over a predetermined period of time. In one embodiment, the period of time can be dependent on the on the density or stability of neighboring wireless nodes 101. For example, if the composition of the neighboring wireless nodes 101 is changing rapidly, the time period can be shorter. Similarly, if the composition of the neighboring wireless nodes 101 is more stable, the time period can be longer. In either case, the awareness services module 111 observes whether there are any messages related to one or more of the active communities (e.g., by checking the header information of the messages for CIDs corresponding to any of the active communities) (step 307). If no messages are observed over the predetermined period of time for a particular community, the awareness services module 111 designates that community as inactive and updates the list of active communities accordingly (step 309). If a message related to a particular community is observed during the time period, the community is considered to be still active and the awareness services module 111 need not update the list of active communities. It is contemplated that the awareness services module can continuously or periodically perform the monitoring process to update the list of active communities.

Figure 3B:
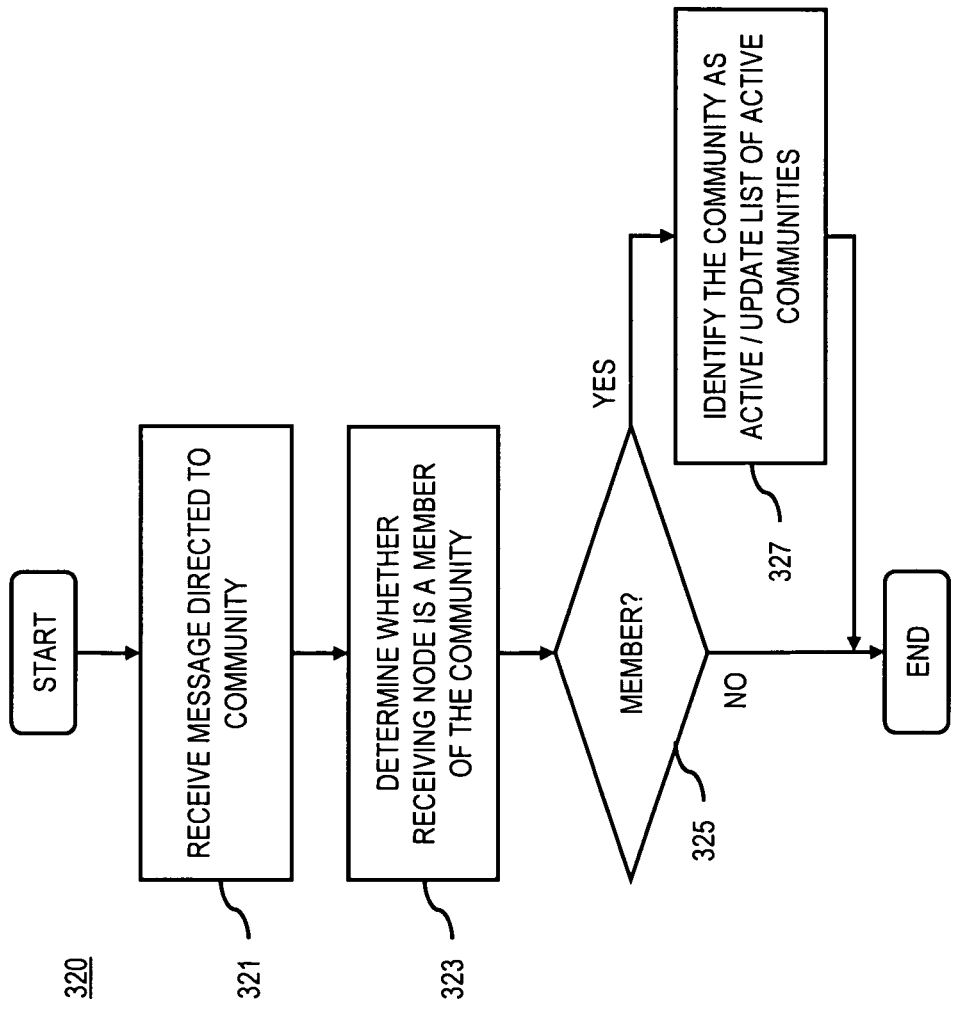

FIG. 3B is a flowchart of a process for passively identifying an active community by monitoring community messages, according to one embodiment. In one embodiment, the awareness services module 111 performs the process 320 of FIG. 3B and is implemented in, for instance, a chip set including a processor and a memory as shown in FIG. 9. In step 321, the awareness services module 111 receives a message directed to one or more communities from a neighboring wireless node 101 over the ad-hoc mesh network 109. The awareness services module 111 then determines whether the receiving wireless node 101 is a member of the community to which the message is directed (step 323). For example, the determination may involve checking whether the CID contained in, for instance, the message header of the received message matches a CID contained in the community directory 243 of the receiving wireless node 101. In certain embodiments, the CID is anonymized to protect the privacy of the community and its members. In this case, the receiving wireless node 101 is a member of the community, the awareness services module 111 may decode the anonymized CID using the authentication key associated with the CID of the community specified in the received message. Further, if the message is encrypted, the awareness services module 111 may open the encryption using the encryption key associated with the CID as listed in the community directory 243. If the awareness services module 111 determines that the receiving node 111 is a member of the community (step 325), the module 111 identifies the community as an active community and updates the list of active communities accordingly (step 327).

Figure 3C:
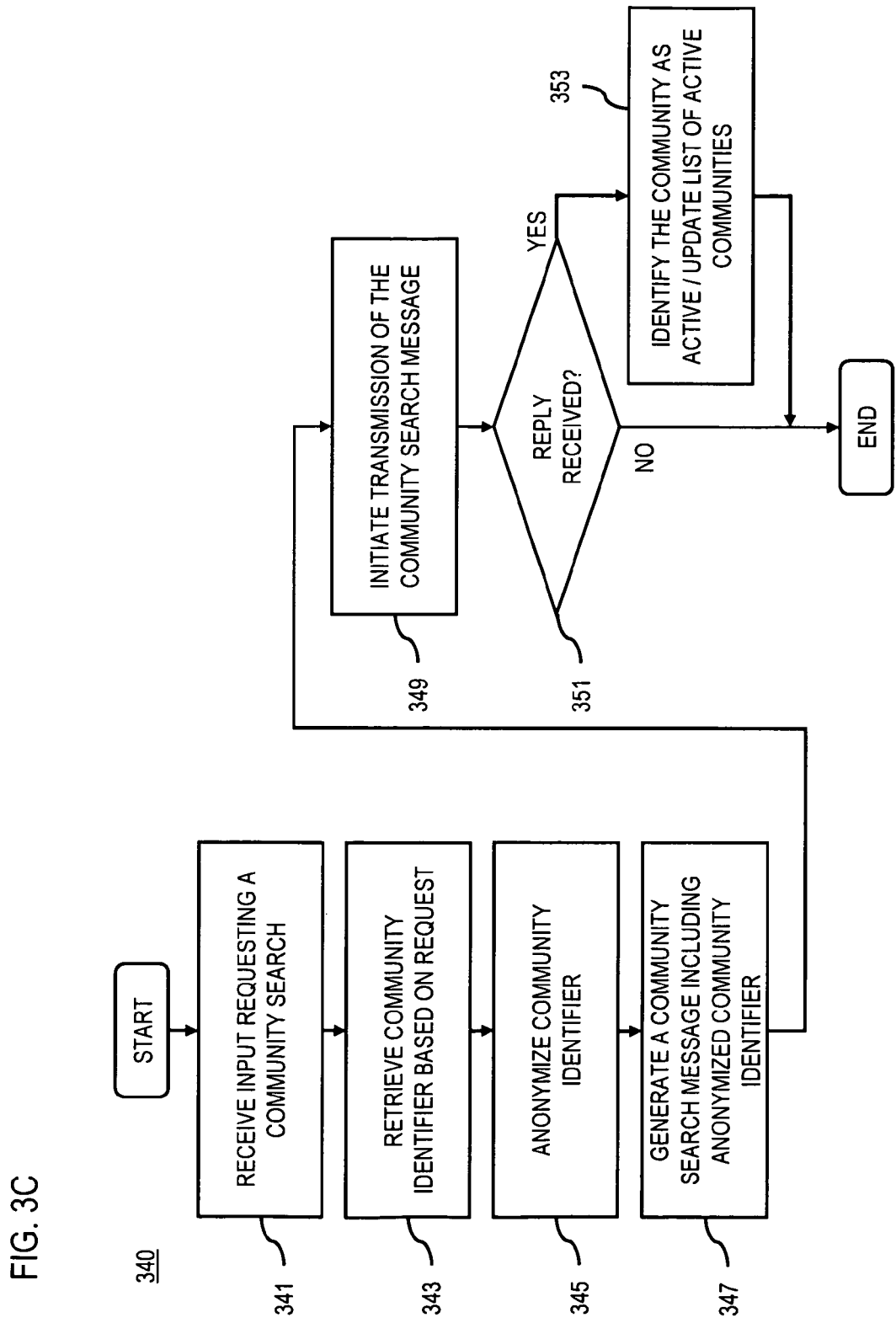

FIG. 3C is a flowchart of a process for actively searching for one or more active communities using a community search message, according to an exemplary embodiment. In one embodiment, the awareness services module 111 performs the process 340 of FIG. 3C and is implemented in, for instance, a chip set including a processor and a memory as shown in FIG. 9. In step 341, the awareness services module 111 receives input requesting a search for one or more active communities in the local neighborhood of the ad-hoc mesh network 109. The input is received from, for instance, the application 201 through the application programming interface 225 (as described with respect to FIGS. 2A and 2C). For example, the input may specify one or more communities for which to search. In response, the awareness services module 111 retrieves a CID for each requested community (step 343). In certain embodiments, the CIDs are anonymized to protect the privacy of the community and its members (step 345). Using anonymized CIDs protects privacy by making it more difficult for an outsider to track communications related to any particular community. The community control module 241 then generates a community search message containing a containing a unique community query identifier CQID and a list of anonymized CIDs (step 347).

After creating the message, the awareness services module 111 initiates broadcast of the message over the ad-hoc mesh network 109 (step 349). In exemplary embodiments, the community search message is equivalent to a query and is transmitted and replied to using the processes described with respect to FIGS. 5A and 5B below. As the message propagates over the ad-hoc mesh network 109, mobile devices that are members of one or more of the active communities associated with the anonymized CID or CIDs included in the message automatically respond to mobile device that originally sent the message. The awareness services module 111 initiates receipt of the reply messages (step 351). The reply message contains, for instance, a list of anonymized CIDs of those searched communities which have an "active" status in the replying node 101. Based on this list, the awareness services module 111 identifies each community in the list as an active community and updates the list of active communities in, for instance, the community directory 243 (step 353).

Figure 3D:
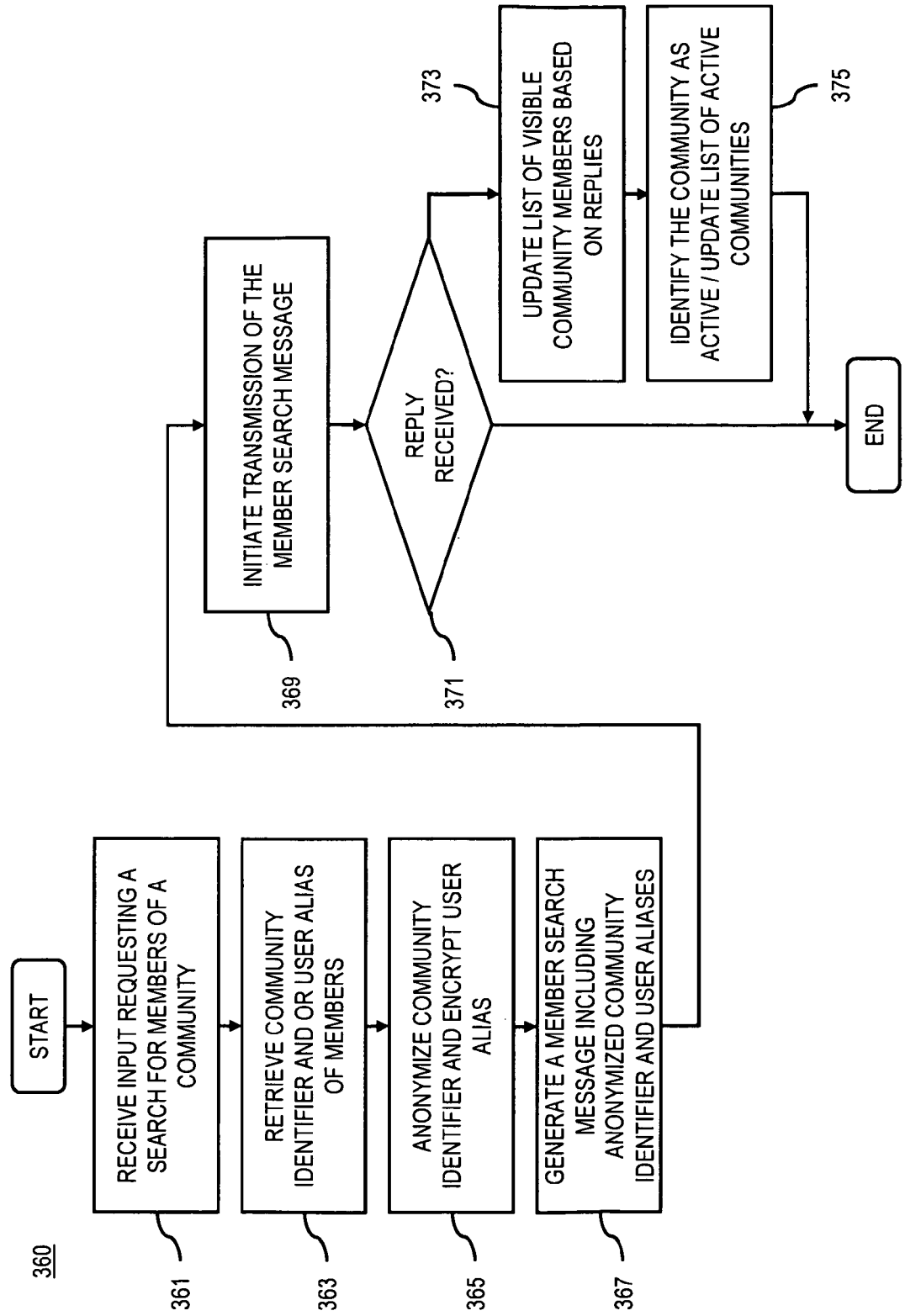

FIG. 3D is a flowchart of a process for actively determining the presence and community-specific identity (e.g., alias) of members of a particular community or communities, according to an exemplary embodiment. In one embodiment, the awareness services module 111 performs the process 360 of FIG. 3D and is implemented in, for instance, a chip set including a processor and a memory as shown in FIG. 9. In step 361, the awareness services module 111 receives input requesting a search for one or more members of a community. The input is received from, for instance, the application 201 through the application programming interface 225 (as described with respect to FIGS. 2A and 2C). For example, the input may specify one or more communities whose members are to be searched for. In step 363, the awareness services module 111 retrieves the CID or CIDs associated with the requested community or communities from the community directory 243. In certain embodiments, the CIDs are anonymized to protect the privacy of the community and its members (step 365). If any one of the communities is set in the "visible" state, the awareness services module 111 also retrieves the community-specific user identity (e.g., an alias) of the user for that community. By way of example, the encryption/decryption module 245 of the awareness services module 111 may also encrypt the user alias in step 365 using, for instance, one or more of the keys associated with each community in the community directory 243. The community control module 241 then generates a member search message containing a unique community query identifier CQID, a list of anonymized CIDs, and corresponding plaintext (in case of a public community) or encrypted (in case of a private community) aliases of the members for which to search (step 367).

After the member search message is generated, the awareness services module 111 initiates broadcast of the member search message over the ad-hoc mesh network 109 (step 369). In exemplary embodiments, the member search message is equivalent to a query and is transmitted and replied to using the processes described with respect to FIGS. 5A and 5B below. As the message propagates over the ad-hoc mesh network 109, mobile devices that have one or more communities associated with the anonymized CID or CIDs in the "visible" state automatically respond to the mobile device that originally sent the message. If aliases corresponding to one or more users are also included in member search message, mobile devices corresponding to the user aliases also respond. The awareness services module 111 initiates receipt of the reply messages sent in response to the member search message (step 371). The reply message includes, for instance, a list of anonymized CIDs, plaintext or encrypted user aliases and, possibly, the plaintext or encrypted status (e.g. activity state, mode, etc.) of the community member. In certain embodiments, the awareness services module 111 uses the reply messages to update the list of visible community members in the local neighborhood (step 373). In addition, the awareness services module 111 also uses the replies to identify active communities within the neighborhood and to update the list of active communities (step 375). The updates are based, for instance, on the anonymized CIDs, the community-specific member identity (e.g., alias), o other member-specific information included in the reply messages.

Figure 4:
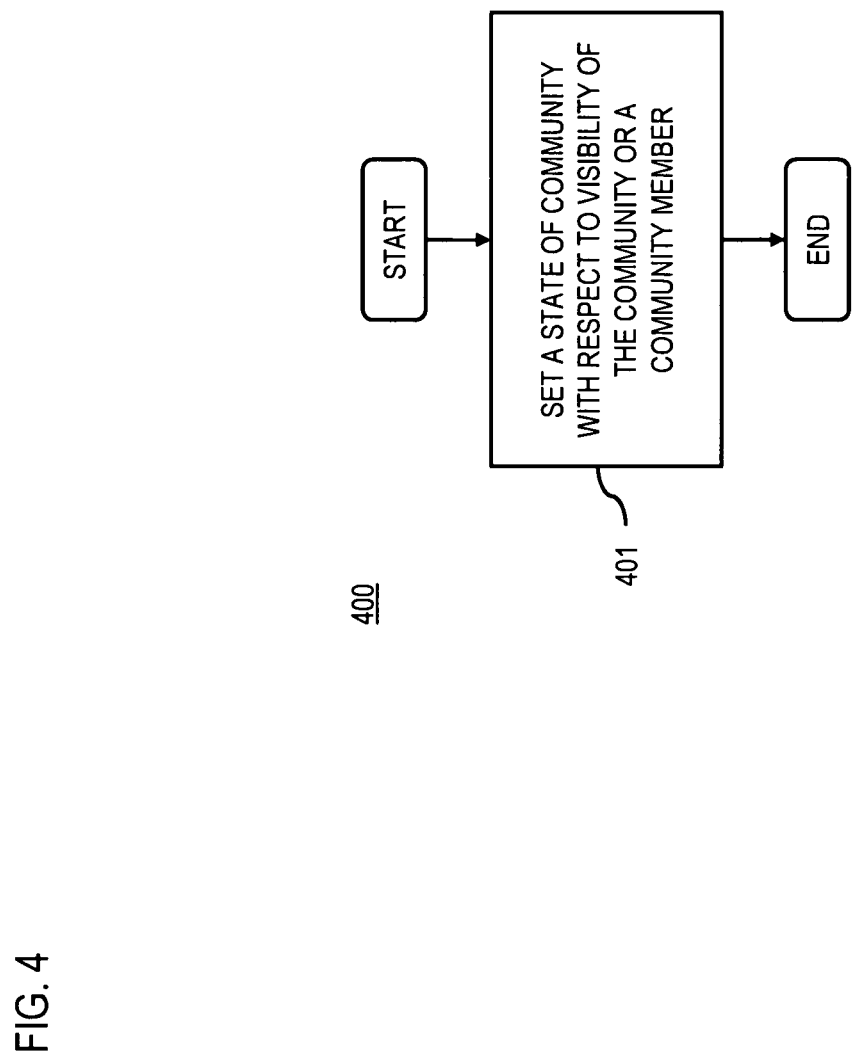
FIG. 4 is a flowchart of a process for setting a state of a community to change the visibility of community or community member, according to an exemplary embodiment.

FIG. 4 is a flowchart of a process for setting a state of a community to change the visibility of community or community member, according to an exemplary embodiment. In one embodiment, the awareness services module 111 performs the process 400 and is implemented in, for instance, a chip set including a processor and a memory as shown in FIG. 9. In step 401, the awareness services module 111 enables the user to set a state corresponding to a community that determines the visibility of the community or a member of the community. The different states of the community and how the state affects the visibility of status of the community are discussed with respect to FIG. 2D. For example, in various embodiments, when a community is active, it is capable of sending and receiving community specific messages. Similarly, when a community member is visible, the user alias associated with the community member can be queried and sent to other community members.

Moreover, it is contemplated that the state of a community in a wireless node 101 can be used to filter incoming messages. For example, to block all incoming or outgoing messages, a user can set the state of a community to inactive so that all messages from that particular community are disregarded. It is contemplated that a user belonging to multiple communities may independently set the visibility state for each community. By way of example, to block incoming advertisements, the user can set the state to inactive for the community sending the advertisements. It is also contemplated that the user can automatically set the visibility state based on criteria such as time (e.g., to automatically set a visibility state at certain periods of the day), location (e.g., to automatically set a visibility state at certain locations such as work or school), or any other context (e.g., while in a meeting or at dinner).

Figure 5A:
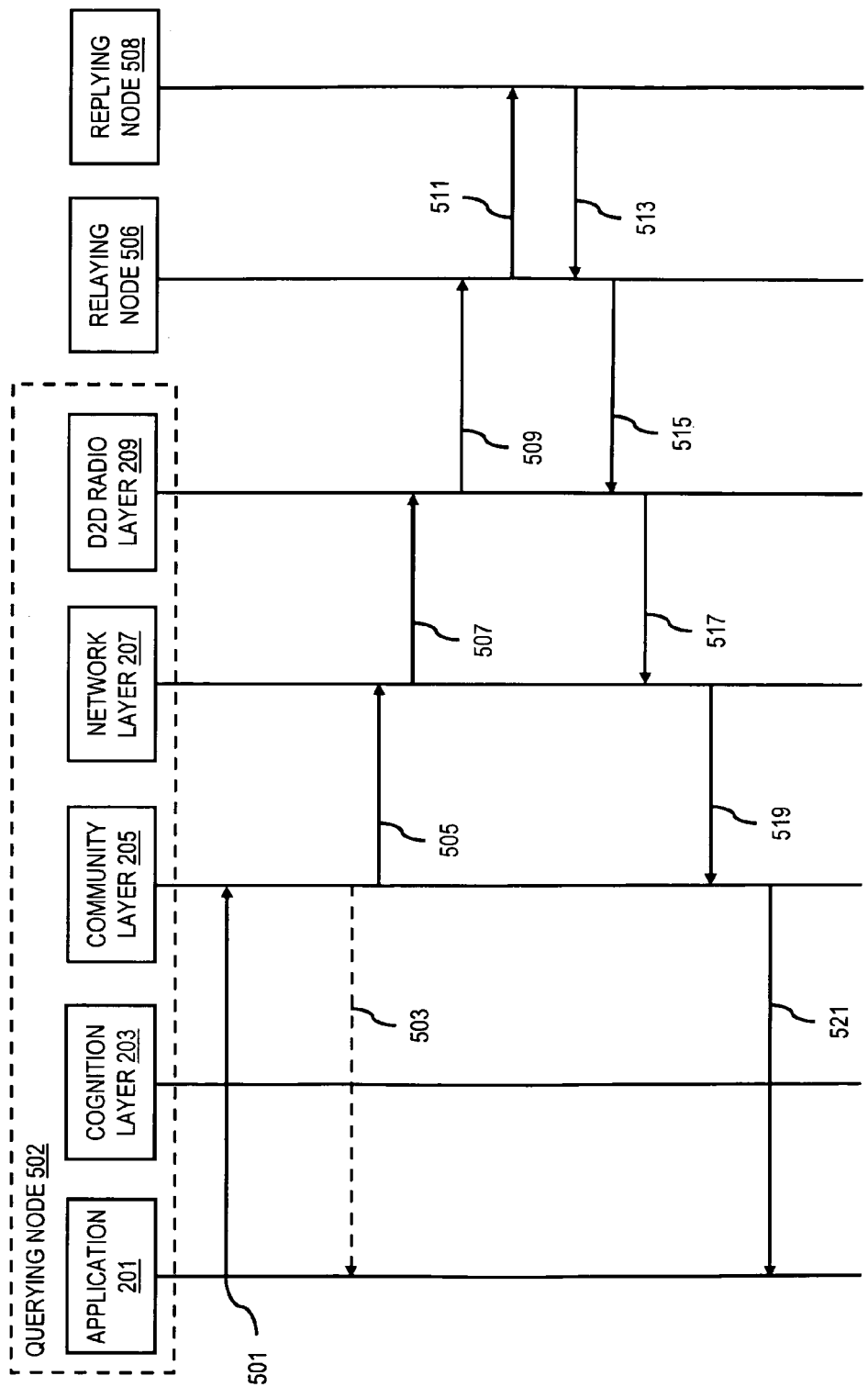
FIG. 5A is a ladder diagram that illustrates a sequence of messages and processes used in a querying node, according to an exemplary embodiment.

FIG. 5A is a ladder diagram that illustrates a sequence of messages and processes used in a querying node, according to an exemplary embodiment. A network process is represented by a thin vertical line. A step or message passed from one process to another is represented by horizontal arrows. A dashed horizontal arrow represents an optional step or message. The processes represented in FIG. 5A are the querying node 502, relaying node 506, and replying node 508. Within querying node 502, the following additional processes are represented: application 201, cognition layer 203, community layer 205, network layer 207, and D2D radio layer 209.

In step 501, the application 201 within querying node 502 generates a request for searching community information (e.g., wireless nodes 101 having active communities or communities with visible members) over the ad-hoc mesh network 109 and sends the request to the community layer 205 of the querying node 502. The community layer 205 generates a community query message, assigns a community query identification number (CQID) to the query message and prepares the query message for transmission over the ad-hoc mesh network 109 by marking the query with CIDs of the communities from which the user is seeking information. If the user seeks information on members of the communities and the communities are private, the community layer 205 encrypts the community-specific user identity (e.g., alias) using the encryption keys associated with the respective CID and stored in the community directory 243 (FIG. 2C). If the community directory 243 contains recent information about active communities in other nodes then the community layer 205 may return the community information (step 503). The community layer 205 then sends the anonymized and partly encrypted message to the network layer 207 (step 505).

The network layer 207 assigns a message sequence number (MID) to the query message and adds fields to the network layer message header 281 (FIG. 2F) to indicate that the querying node 502 is the source and transmitter of the query message (e.g., using the NID). The network layer 207 sends the query message to the D2D radio layer 209 of the querying node 502 for broadcasting in the ad-hoc mesh network 109 (step 507).

The query message is then broadcasted to one or more relaying nodes 506 (step 509). All the nodes that are able to receive the broadcast message are relaying nodes. After processing by the relaying node 506, the query message is rebroadcasted to another relaying node or to the replying node 508 (step 511). The processes of the replying node 508 are described with respect to FIG. 5C. After processing of the query message by the replying node 508, a reply message is generated and sent to the relaying node 506 (step 513) which routes the reply message either to another relaying node or to the querying node 502 (step 515) based on the route stored in the routing table 273.

At the querying node 502, the D2D radio layer 209 receives and acknowledges the reply message and forwards the reply message to the network layer 207 (step 517). The network layer 207 determines that the querying node 502 is the intended destination of the reply message by checking the DST field 294 in the network layer message header 281 and sends the message to the community layer 205 for processing (step 519). In case of a private community, the community layer 205 decrypts the reply message using the appropriate encryption keys stored in the community directory 243. Based on the information in the reply message, the community layer 205 updates information in the community directory 243 (list of active communities and the lists of visible members in the communities) and finally sends a service response to the query to the application 201 (step 521).

Figure 5B:
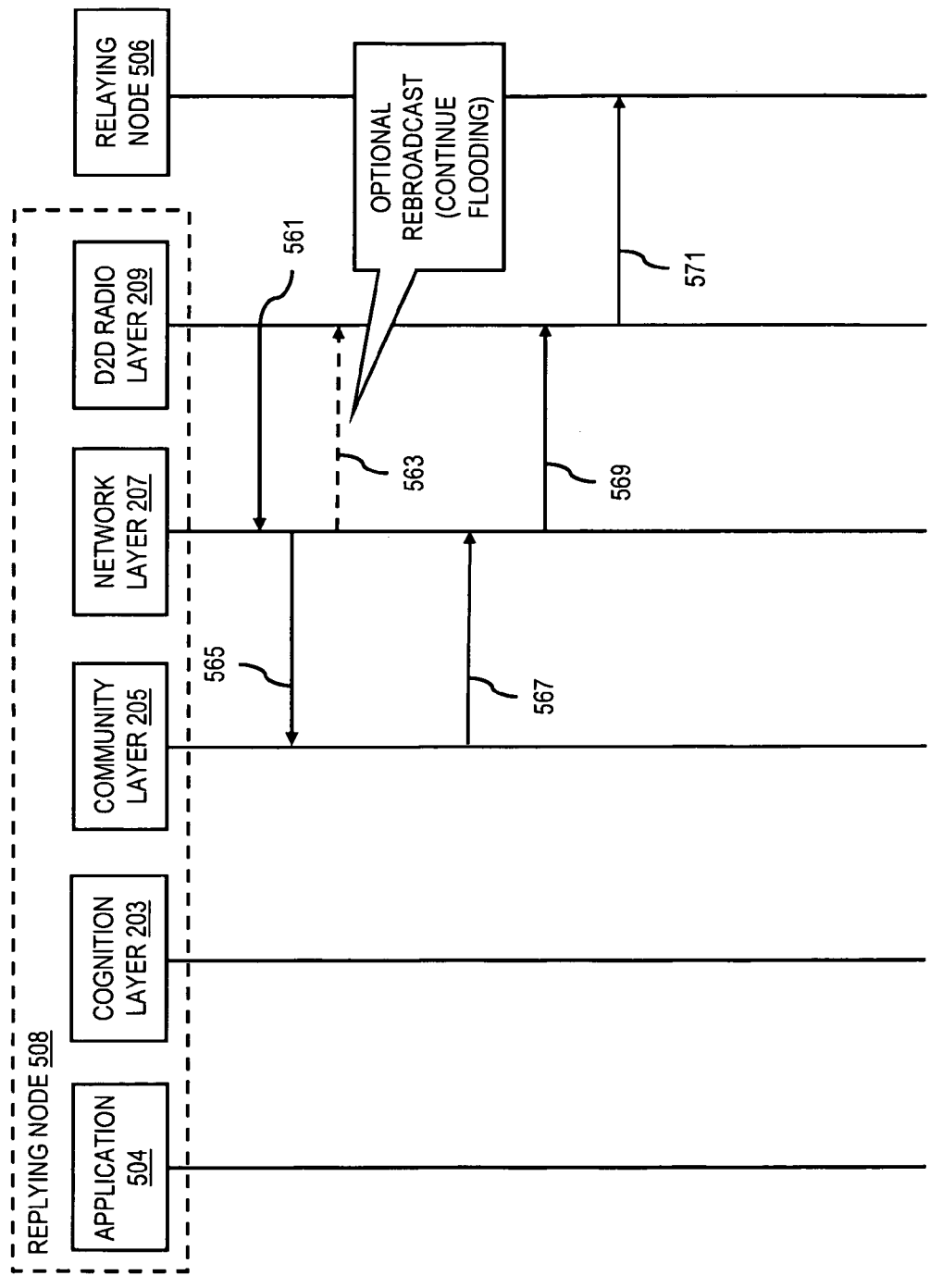
FIG. 5B is a ladder diagram that illustrates a sequence of messages and processes used in a replying node, according to an exemplary embodiment.

FIG. 5B is a ladder diagram that illustrates a sequence of messages and processes used in a replying node, according to an exemplary embodiment. A network process is represented by a thin vertical line. A step or message passed from one process to another is represented by horizontal arrows. A dashed horizontal arrow represents an optional step or message. The processes represented in FIG. 5B are the replying node 508 and the querying node 502. Within replying node 508, the following additional processes are represented: application 201, cognition layer 203, community layer 205, network layer 207, and D2D radio layer 209.

In step 561, the D2D radio layer 209 of the replying node 508 receives the query message and forwards it to the network layer 207 of the replying node 508. The network layer 207 may decide to rebroadcast the query message (step 563). On receipt, the network layer 207 forwards the query message to the community layer 205 (step 565).

If the community layer 205 determines that the query message contains one or more anonymized CIDs of the active communities associated with the replying node 508 and the query message contains encrypted user aliases, the community layer 205 decrypts the message and updates information in its community directory 243 (e.g., containing the list of active communities and the list of visible members of the communities). Next, the community layer 205 generates a reply message that contains the same CQID as the incoming query and has the source NID of the query message set as the destination NID of the reply message. If the query requests visible user aliases and the user alias in the node 508 is set as visible then the community layer 205 encrypts the user alias with the encryption keys associated with the community. The community layer 205 then retrieves a new anonymized CID from the community directory 243 and sends the reply message to the network layer 207 (step 567).

On receipt of the reply message, the network layer 207 assigns a new message sequence number (MSN) to the reply message, attaches the NID of the replying node 508 as the source and transmitter, finds the NID of the relaying node 506 for the next hop from the routing table 263, sets the receive NID of the reply message as the next hop and sends the reply message to the D2D radio layer 209 (step 569). The D2D radio layer 209 sends the reply message as a unicast message addressed to a relaying node 506 over the ad-hoc mesh network 109 (step 571).

Figure 6A:
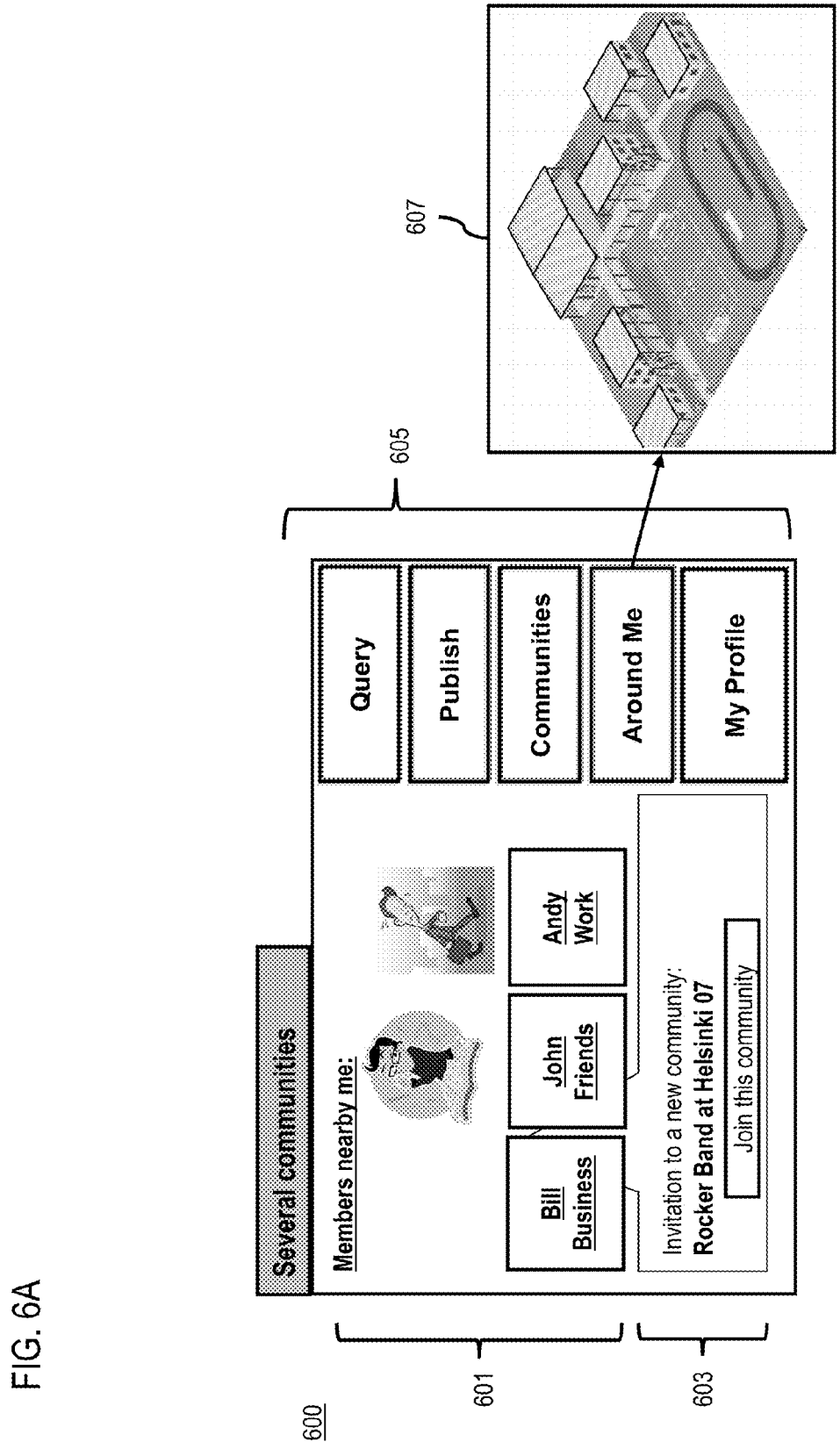
FIGS. 6A-6B are diagrams of a user interface utilized in the process of locating communities over an ad-hoc mesh network, according to various exemplary embodiments.
Figure 6B:
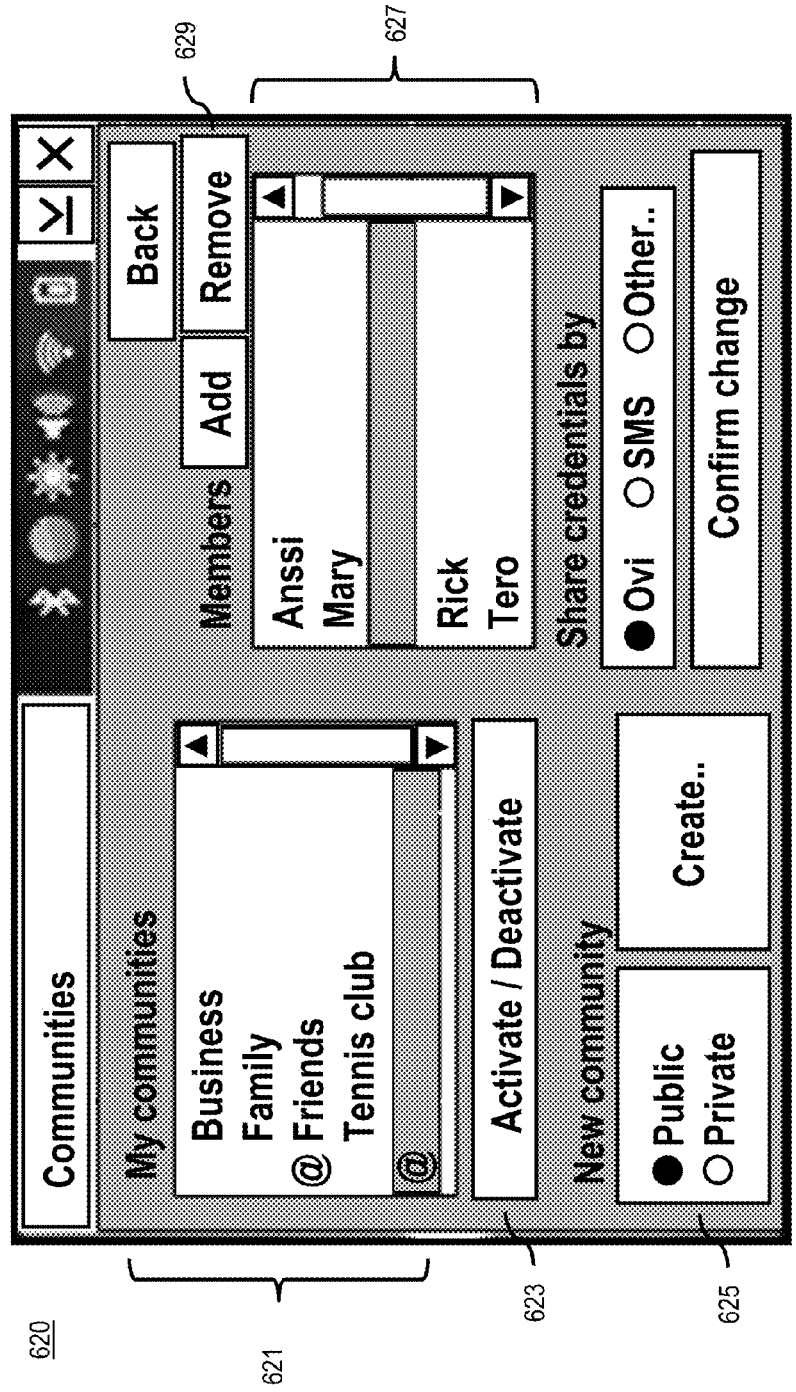

FIGS. 6A-6B are diagrams of a user interface utilized in the process of locating communities over an ad-hoc mesh network, according to various exemplary embodiments. FIG. 6A depicts a user interface 600 listing community related information and commands for managing and accessing awareness information. For example, section 601 lists community members who are nearby the wireless node 101. The members may be from one or more different communities. Selecting a member enables a user to contact the member, view the status of the member, or access other applications or functions related to the user. Section 603 may display, for instance, status commands or prompts such as an invitation to join a particular community. User interface 600 also provides selectable menu options 605 to initiate additional commands. For example, selecting the option "Around Me" prompts the display of a map 607 with the locations of community members.

FIG. 6B depicts a user interface 620 for managing communities. For instance, section 621 displays currently defined communities with an option 623 to activate or deactivate each community individually. Users may also designate each community as either public or private using the control 625. Members of each community are displayed in section 627, along with controls 629 for adding or removing members.

Figure 7A:
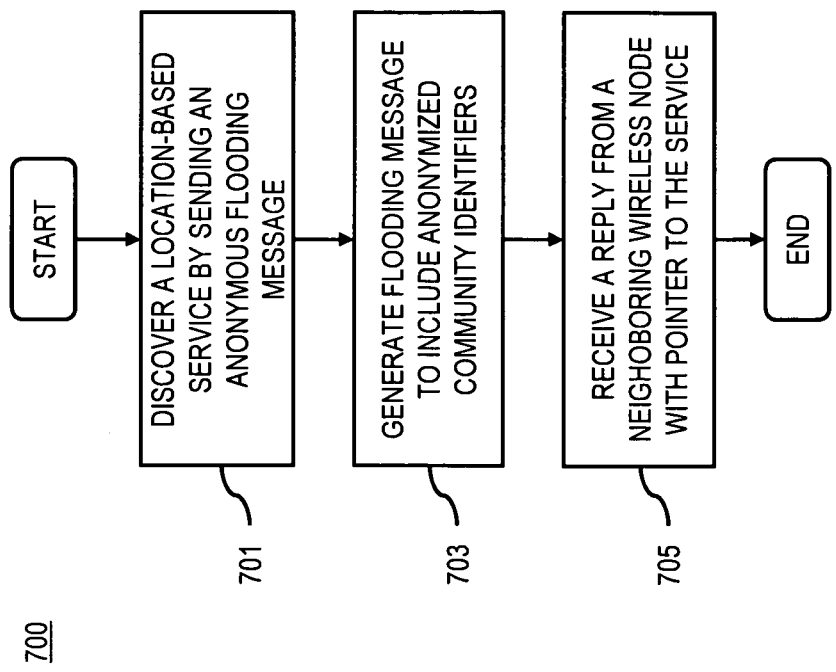
FIGS. 7A-7B are flowcharts of processes for discovering a location-based service using a flooding message, according to various exemplary embodiments.
Figure 7B:
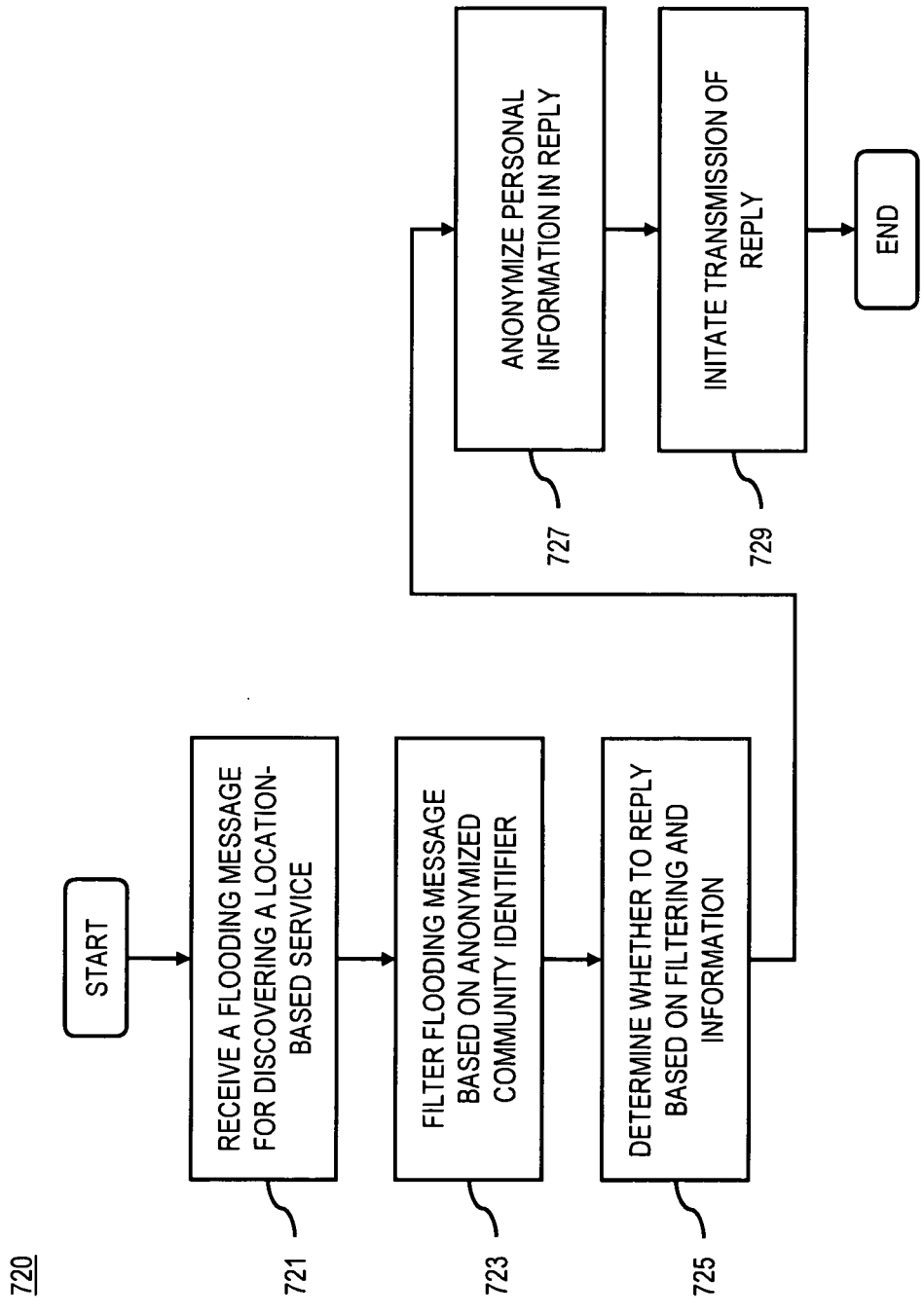

FIGS. 7A-7B are flowcharts of processes for discovering a location-based service using a flooding message, according to various exemplary embodiments. As previously discussed, the system 100 provides an awareness information platform that application developers can use to develop new and compelling applications. These applications, for instance, can be used to provide a service or activity for a community within the ad-hoc mesh network 109 and the communication network 103. For example, the service or activity may be location-based whereby the locations of the participating nodes 101 affect the service or the information provided by the service. The process 700 of FIG. 7A and the process 720 of FIG. 7B can form the framework in which these applications operate.

Figure 14:
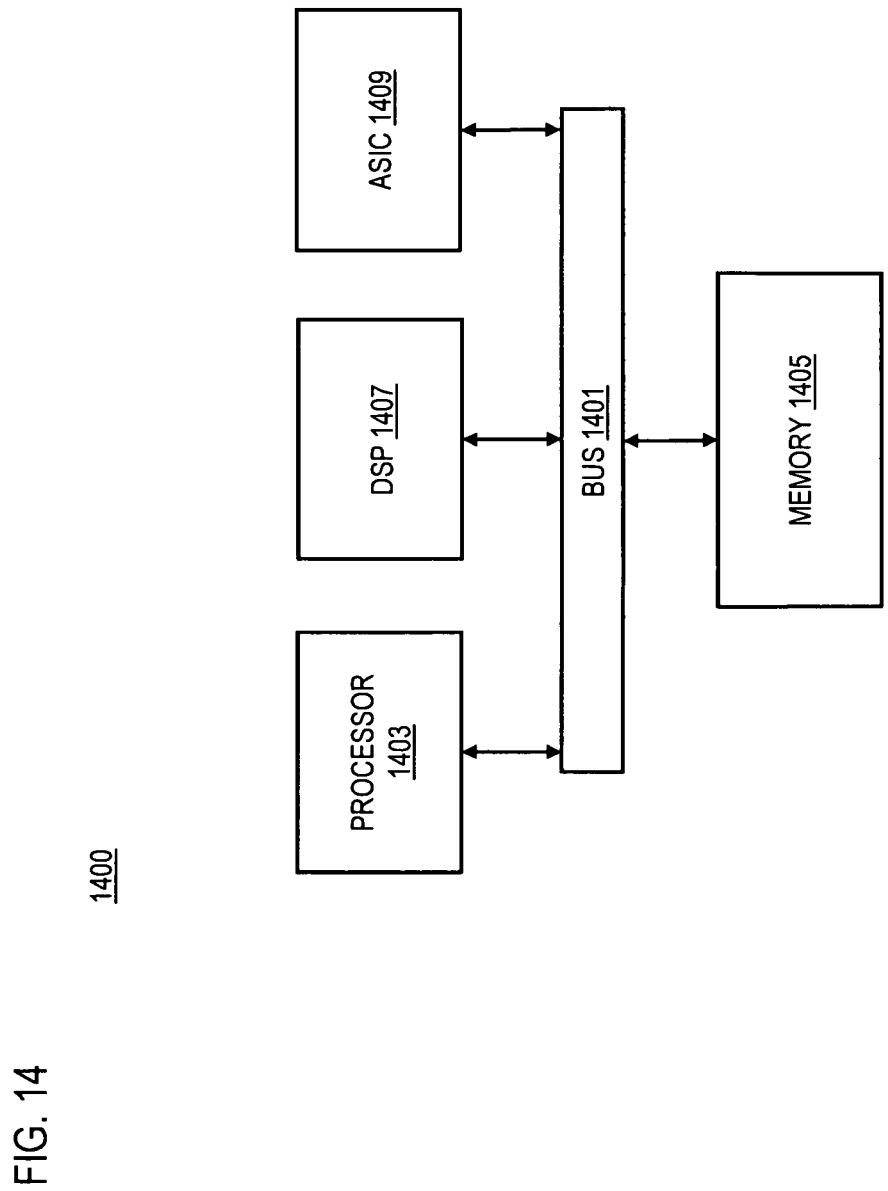
FIG. 14 is a diagram of a chip set that can be used to implement an embodiment of the invention.

In one embodiment, the awareness services module 111 performs the process 700 and the process 720, and is implemented in, for instance, a chip set including a processor and a memory as shown in FIG. 14. In step 701, the awareness services module 111 discovers a location-based service by sending an anonymous flooding message including a query over the ad-hoc mesh network 109. In one embodiment, the flooding message directed to discover a location-based service provided by one or more communities that are active over the ad-hoc mesh network 109. For example, the awareness services module 111 can generate the flooding message to include anonymized community identifiers associated with or specifying each of the active communities to be search (step 703). As discussed previously, anonymizing the community identifier before transmitting the identifier of the ad-hoc mesh network 109 protects the privacy of information shared among community members. As described with respect to FIGS. 3A-3D, the awareness services module 111 maintains a list of active communities by either passively monitoring messaging traffic or actively searching for active communities and/or visible community members over the local neighborhood of the ad-hoc mesh network 109. In some cases, the communities may be either public (e.g., open and visible to all wireless nodes 101 in the ad-hoc mesh network 109) or private (e.g., visible only to wireless nodes 101 possessing the corresponding CID and authentication/encryption keys). In one embodiment, the list of active communities and visible community members are stored in the community directory 243 of the awareness services module 111 of each wireless node 101 in the ad-hoc mesh network 109. By way of example, the local neighborhood of the ad-hoc mesh network 109 includes one or more wireless devices (e.g., wireless nodes 101) within a predetermined range or geographical location. For example, the predetermined range may be specified as a radius (e.g., a radius of 100 yards extending from a wireless device), a geographic area (e.g., within a school campus, shopping mall, store, etc.), or any other suitable designation of a range.

The awareness services module 111 may then receive a reply to the flooding message from one or more neighboring wireless nodes 101 (step 705). The reply, for instance, includes a pointer to the discovered location-based service. By way of example, the pointer identifies one or more services associated with the anonymized community identifiers included in the flooding message. In one embodiment, this identification step includes automatically discovering service- or activity-related information from one or more members of the selected community. In exemplary embodiments, the information may include intimate information (e.g., the user's music preference, mood, etc.). In addition, the information or content is discovered anonymously (e.g., the identity or alias of the information owner is encrypted) unless specifically directed otherwise by the information owner. In this way, the information is shared while protecting privacy or anonymity. Content includes any file or media of a wireless device. The process of discovering the information or content is described with respect to FIGS. 5A and 5B via broadcast queries (e.g., flooding messages) and corresponding replies (e.g., unicast replies).

Based on the discovered information or content, the awareness services module 111 selects the service or activity and initiates participation in the selected service or activity. In one embodiment, the discovered information includes location indication data (e.g., navigation information). In this way, nodes 101 that have location sensors (e.g., GPS receivers) can share the location information so that nodes 101 without location sensor may nonetheless obtain the location indication data over the ad-hoc mesh network 109. The discovered location-based services may also include an indication of a local event (e.g., news of a local sporting event or concert) or an indication of any other type of local information matching the query of the flooding of the message or the discovery location-based service. In this context, local refers to information of content that is associated or related to the location of the either the querying or replying nodes. For example, a user is searching for a restaurant to dine in, but is unfamiliar with the restaurants in the area. An application may direct the awareness services module 111 to locate nearby members of a community with similar food tastes to the user. The application may then present a list of nearby restaurants with the number of community members in each who have similar food tastes. In this way, the user can learn which restaurant is most popular according to the user's taste preferences. The user then selects the activity (e.g., dining at a particular restaurant) based on the information.

In certain embodiments, when participating in the service or activity, the awareness services module 111 may generate notifications to the user about the service or activity. For example, these notifications can be received automatically (1) to provide information related to the service or activity, (2) to provide a status of the service or activity, (3) and/or to otherwise alert the user about the service or activity. For example, a community can be formed for sharing a hobby such as gardening. Within the community, an available application supports a discussion forum service on gardening tips. The user may select the community to access the discussion forum service. As new tips are posted to the discussion forum, the discussion forum service can direct the awareness services module 111 to notify the user.

While participating in the service or activity, the awareness services module 111 may also share information or content stored locally on the user's wireless device. As described above, the information is shared anonymously unless the user directs otherwise. Additionally, the user may specify that the information or content is shared with all members of a community, particular members of a community, all communities, particular communities, or any combination thereof. For example, a singer would like to share his latest song with his community of fans that are within the local environment. To accomplish this, the singer uses, for instance, an application to locally publish a pointer (e.g., a URL) to the song over the ad-hoc mesh network 109.

FIG. 7B is flowchart of a process for replying to a flooding message sent to discover a location-based service, according to an exemplary embodiment. In step 721, a wireless node 101 receives a flooding messaging for discovering a location-based service over the ad-hoc mesh network 109. On receiving the flooding message, the awareness services module 111 of the receiving wireless node 101 filters the flooding message based on the anonymized community identifiers included in the message. For example, to filter the flooding message, the awareness services module 111 of the receiving node 101 compares anonymized community identifiers in the flooding message against the anonymized community identifiers stored in the receiving wireless node 101 (e.g., stored in the community directory 243 of the wireless node 101). In one embodiment, the wireless node 101 stores anonymized community identifiers for each of the communities to which the wireless node 101 belongs. If none of the anonymized community identifiers match, the awareness service module 111 disregards the flooding message and does not respond. If there is a match, the awareness services module 111 then determines whether it has the information or service to respond (step 725). The information may include for example a pointer to a location-based service or information related to the location-based service. If the wireless node 101 contains or has access to the requested service or information, the awareness services module 111 initiates a reply to the flooding message. The reply, for instance, includes a pointer to the discovered location-based service. The module 111 can also anonymize any personal information (e.g., musical preferences, food preferences, playlists, etc.) (step 727). In addition, any information that may identify the user of the responding node 101 is not disclosed. After anonymizing personal information, the awareness services module 111 of the wireless node 101 initiates transmission, as in step 729, of the reply message over the ad-hoc mesh network 109 to the querying node.

Examples of services using awareness information over the ad-hoc mesh network 109 are provided in FIGS. 8-11 below.

Figure 8:
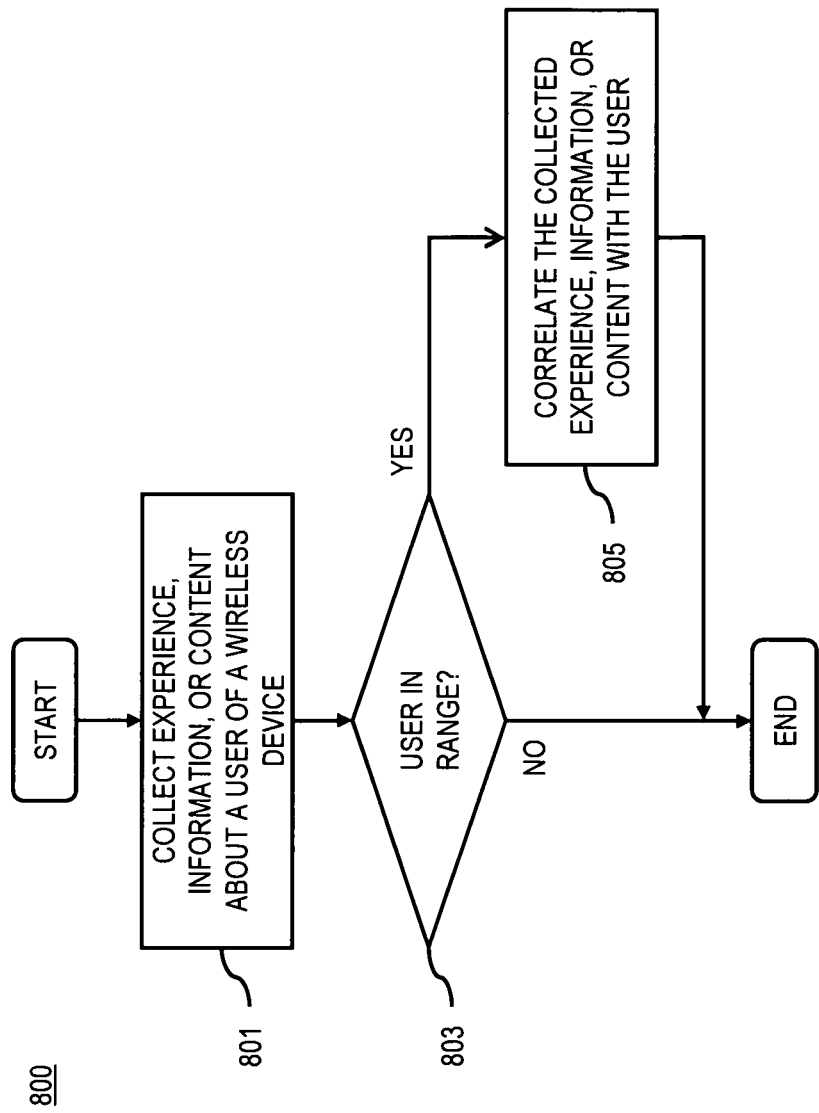
FIG. 8 is a flowchart of a process for providing a service for collecting experiences, information, and content, according to an exemplary embodiment.

FIG. 8 is a flowchart of a process for providing a service for collecting experiences, information, and content, according to an exemplary embodiment. In one embodiment, the awareness services module 111 performs the process 800 and is implemented in, for instance, a chip set including a processor and a memory as shown in FIG. 14. In step 801, the awareness services module 111 collects information or content about a user of one of the wireless devices within a selected community. In exemplary embodiments, this information or content is automatically collected over the ad-hoc mesh network as the user comes within a predetermined range of the wireless device containing the collecting awareness services module 111. The information collection and exchange occurs automatically via, for instance, the query and reply processes of FIGS. 5A and 5B.

After storing the information, an application may direct the awareness services module 111 to determine when the user from whom the information or content has been collected comes back within the predetermined range (step 803). When the wireless devices associated with the user comes back within range, the awareness services module 111 correlates the previously collected information or content with the user and presents the collected information. For example, a person encounters a business associate on the street. The person's wireless device that is equipped with the awareness services module 111 and an activity log application reports that the person last met the business associate at a company retreat two months ago.

FIG. 9 is a flowchart of a process for providing a service for targeted advertising, according to an exemplary embodiment. In one embodiment, the awareness services module 111 performs the process 900 and is implemented in, for instance, a chip set including a processor and a memory as shown in FIG. 14. In step 901, the awareness services module 111 determines context information corresponding to one or more of the wireless devices of a community. In this case, the users of the one or more wireless devices are the target of the advertising application. In exemplary embodiments, context information can be identified using a CID. For example, as a user watches an advertisement or accesses a product page on the user's wireless device, a CID corresponding to the advertisement or product can be placed in the awareness services module 111 of the user's wireless device. In other words, when the user watches an advertisement, the user becomes part of the community of people who have watched the advertisement, as identified by the CID.

When the user is near a store that sells the product in the advertisement, the awareness services module 111, for example, automatically queries the store for information related to the product and receives in reply a targeted advertisement directed to the user (step 903). This process enables a retailer to send a targeted advertisement to a user that is physically close to the store (e.g., as evidenced by connection over the short range ad-hoc mesh network 109) and is likely to be interested in the product because the user has, in fact, watched the advertisement or searched for the product over the Internet.

Figure 10:
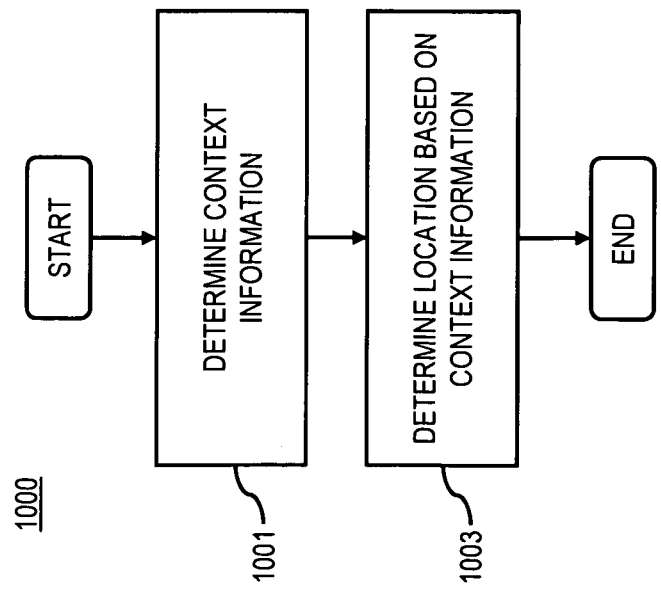
FIG. 10 is a flowchart of a process for providing a service for determining location based on context information, according to an exemplary embodiment.

FIG. 10 is a flowchart of a process for providing a service for determining location based on context information, according to an exemplary embodiment. In one embodiment, the awareness services module 111 performs the process 1000 and is implemented in, for instance, a chip set including a processor and a memory as shown in FIG. 14. In step 1001, the awareness services platform determines context information corresponding to one or more wireless devices of a selected community. As described with respect to FIG. 9 above, the context information can be identified using a CID. By way of example, a wireless device that visits a certain location may have a CID corresponding to the location placed in the awareness services module 111 of the device. For instance, a store may place the CID corresponding to the location of the store in a wireless device, as the device enters the store.

The awareness services module 111 of a wireless device seeking location information determines the location information based on the context information by, for instance, querying neighboring wireless devices to determine whether the neighboring devices contain CIDs corresponding to a certain location (step 903). For example, a high density of devices containing a particular location CID is indicative of the corresponding location.

Alternatively or in addition, the awareness services module 111 may query neighboring devices that contain location sensors (e.g., global positioning satellite (GPS) receivers) for the location information. In this way, the wireless device querying the location may obtain accurate location information even when it is not using or is not configured with its own location sensors.

Figure 11:
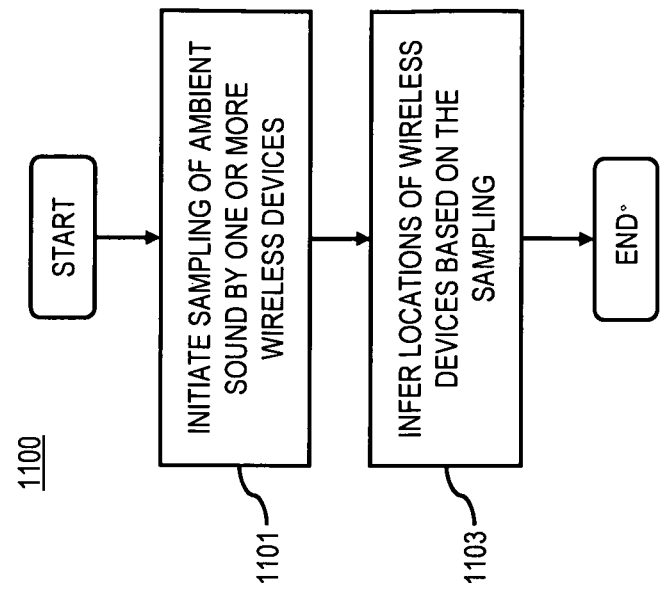
FIG. 11 is a flowchart of a process for providing a service for determining location based on sound, according to an exemplary embodiment.

FIG. 11 is a flowchart of a process for providing a service for determining location based on sound, according to an exemplary embodiment. In one embodiment, the awareness services module 111 performs the process 1100 and is implemented in, for instance, a chip set including a processor and a memory as shown in FIG. 14. In step 1101, to determine location, the awareness services module 111 initiates sampling of ambient sound by one or more of the wireless devices in a selected community. In exemplary embodiments, wireless devices that are within a single radio hop (e.g., determined by a flooding message carrying a message count limit of 1) take samples of the ambient sound from their microphones in a synchronized fashion. The sampling measurements are then disseminated over the ad-hoc mesh network 109. The awareness services module 111 can then infer the locations of the one or more wireless devices by, for instance, comparing the characteristics of the various sound samplings. Differences and similarities in the sound samplings between to one or more wireless devices can indicate proximity of the one or more wireless devices.

Figure 12:
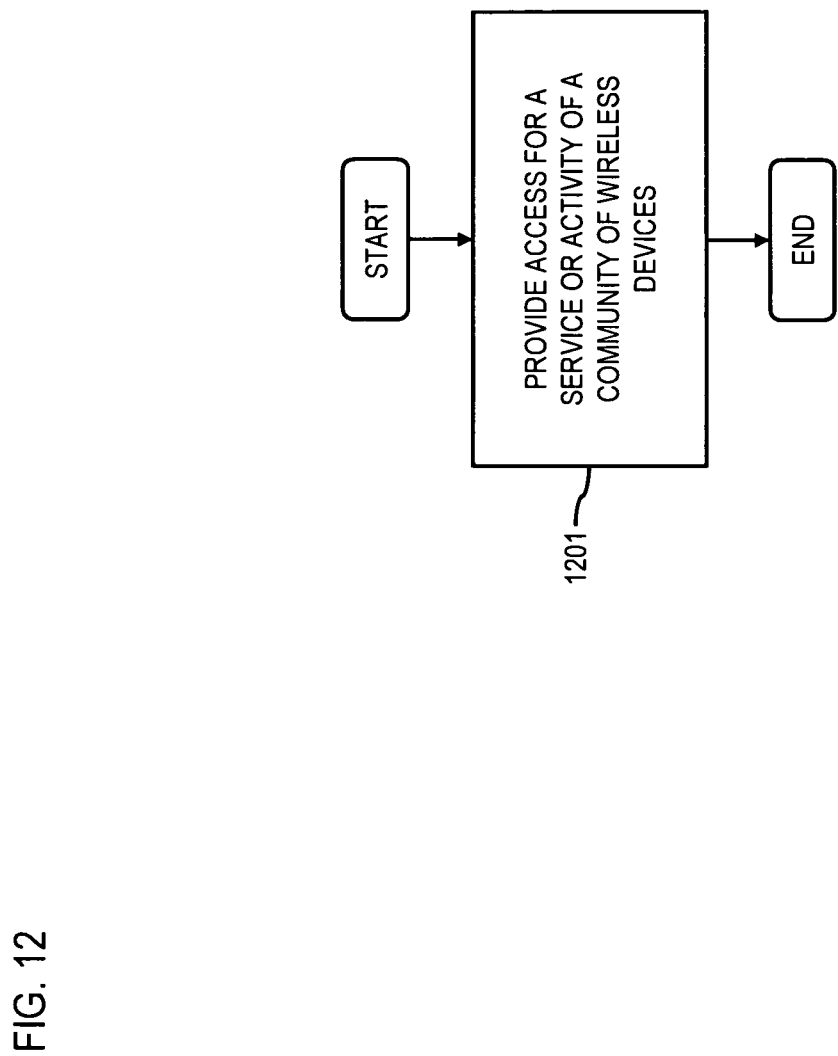
FIG. 12 is a flowchart of a process for providing access for a service or activity, according to an exemplary embodiment.

FIG. 12 is a flowchart of a process for providing access for a service or activity, according to an exemplary embodiment. In step 701, the communication network 103 provides access and support for providing a service or activity. As described previously, the service or activity is associated with a community selected from a list of communities that are active over the ad-hoc mesh network 109. By way of example, the community comprises a plurality of wireless nodes 101 including a radio for device-to-device communication over the ad-hoc mesh network 109. In exemplary embodiments, the ad-hoc mesh network 109 supports only short messages and pointers (e.g., IP address or URL) to content to minimize data traffic. In other words, the transfer of larger files or content takes place over a communication network (e.g., communication network 103) based on the pointer. For example, when a service or activity includes transfer of content or information that cannot be included in the short messages of the ad-hoc mesh network 109, the service or activity uses, for instance, the communication network 103. Therefore, it is contemplated that the communication network 103 works in conjunction with the ad-hoc mesh network 109 to provide sufficient network resources (e.g., bandwidth, etc.) to facilitate the transport of the content and information to support the service or activity between members of communities within the ad-hoc mesh network 109.

The processes described herein for providing a service or activity in an ad-hoc mesh network 109 may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 13:
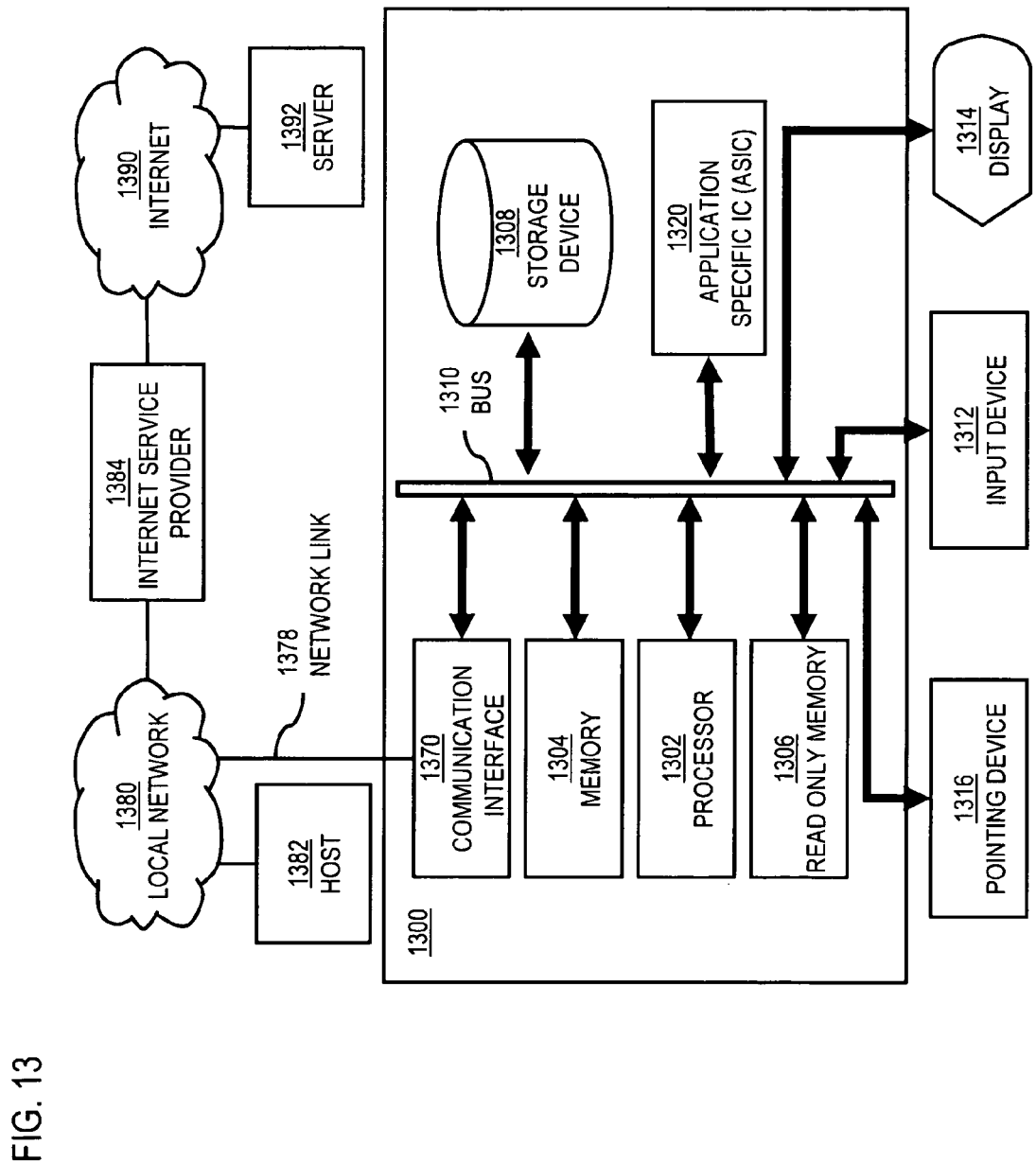
FIG. 13 is a diagram of hardware that can be used to implement an embodiment of the invention.

FIG. 13 illustrates a computer system 1300 upon which an embodiment of the invention may be implemented. Computer system 1300 is programmed to provide a user interface as described herein and includes a communication mechanism such as a bus 1310 for passing information between other internal and external components of the computer system 1300. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1310 includes one or more parallel conductors of information so that information is transferred quickly among devices coupled to the bus 1310. One or more processors 1302 for processing information are coupled with the bus 1310.

A processor 1302 performs a set of operations on information related to providing a service or activity in an ad-hoc mesh network 109. The set of operations include bringing information in from the bus 1310 and placing information on the bus 1310. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1302, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1300 also includes a memory 1304 coupled to bus 1310. The memory 1304, such as a random access memory (RAM) or other dynamic storage device, stores information including processor instructions for providing a service or activity in an ad-hoc mesh network 109. Dynamic memory allows information stored therein to be changed by the computer system 1300. RAM allows a unit of information stored at a location called a memory address to be stored and retrieved independently of information at neighboring addresses. The memory 1304 is also used by the processor 1302 to store temporary values during execution of processor instructions. The computer system 1300 also includes a read only memory (ROM) 1306 or other static storage device coupled to the bus 1310 for storing static information, including instructions, that is not changed by the computer system 1300. Some memory is composed of volatile storage that loses the information stored thereon when power is lost. Also coupled to bus 1310 is a non-volatile (persistent) storage device 1308, such as a magnetic disk, optical disk or flash card, for storing information, including instructions, that persists even when the computer system 1300 is turned off or otherwise loses power.

Information, including instructions for providing a service or activity in an ad-hoc mesh network 109, is provided to the bus 1310 for use by the processor from an external input device 1312, such as a keyboard containing alphanumeric keys operated by a human user, or a sensor. A sensor detects conditions in its vicinity and transforms those detections into physical expression compatible with the measurable phenomenon used to represent information in computer system 1300. Other external devices coupled to bus 1310, used primarily for interacting with humans, include a display device 1314, such as a cathode ray tube (CRT) or a liquid crystal display (LCD), or plasma screen or printer for presenting text or images, and a pointing device 1316, such as a mouse or a trackball or cursor direction keys, or motion sensor, for controlling a position of a small cursor image presented on the display 1314 and issuing commands associated with graphical elements presented on the display 1314. In some embodiments, for example, in embodiments in which the computer system 1300 performs all functions automatically without human input, one or more of external input device 1312, display device 1314 and pointing device 1316 is omitted.

In the illustrated embodiment, special purpose hardware, such as an application specific integrated circuit (ASIC) 1320, is coupled to bus 1310. The special purpose hardware is configured to perform operations not performed by processor 1302 quickly enough for special purposes. Examples of application specific ICs include graphics accelerator cards for generating images for display 1314, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1300 also includes one or more instances of a communications interface 1370 coupled to bus 1310. Communication interface 1370 provides a one-way or two-way communication coupling to a variety of external devices that operate with their own processors, such as printers, scanners and external disks. In general the coupling is with a network link 1378 that is connected to a local network 1380 to which a variety of external devices with their own processors are connected. For example, communication interface 1370 may be a parallel port or a serial port or a universal serial bus (USB) port on a personal computer. In some embodiments, communications interface 1370 is an integrated services digital network (ISDN) card or a digital subscriber line (DSL) card or a telephone modem that provides an information communication connection to a corresponding type of telephone line. In some embodiments, a communication interface 1370 is a cable modem that converts signals on bus 1310 into signals for a communication connection over a coaxial cable or into optical signals for a communication connection over a fiber optic cable. As another example, communications interface 1370 may be a local area network (LAN) card to provide a data communication connection to a compatible LAN, such as Ethernet. Wireless links may also be implemented. For wireless links, the communications interface 1370 sends or receives or both sends and receives electrical, acoustic or electromagnetic signals, including infrared and optical signals, that carry information streams, such as digital data. For example, in wireless handheld devices, such as mobile telephones like cell phones, the communications interface 1370 includes a radio band electromagnetic transmitter and receiver called a radio transceiver. In exemplary embodiments, the communications interface 1370 enables connection to the communication network 103 for providing a service or activity in an ad-hoc mesh network 109.

The term computer-readable medium is used herein to refer to any medium that participates in providing information to processor 1302, including instructions for execution. Such a medium may take many forms, including, but not limited to, non-volatile media, volatile media and transmission media. Non-volatile media include, for example, optical or magnetic disks, such as storage device 1308. Volatile media include, for example, dynamic memory 1304. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 14 illustrates a chip set 1400 upon which an embodiment of the invention may be implemented. Chip set 1400 is programmed to provide awareness information over an ad-hoc mesh network 109 as described herein and includes, for instance, the processor and memory components described with respect to FIG. 14 incorporated in one or more physical packages. By way of example, a physical package includes an arrangement of one or more materials, components, and/or wires on a structural assembly (e.g., a baseboard) to provide one or more characteristics such as physical strength, conservation of size, and/or limitation of electrical interaction.

In one embodiment, the chip set 1400 includes a communication mechanism such as a bus 1401 for passing information among the components of the chip set 1400. A processor 1403 has connectivity to the bus 1401 to execute instructions and process information stored in, for example, a memory 1405. The processor 1403 may include one or more processing cores with each core configured to perform independently. A multi-core processor enables multiprocessing within a single physical package. Examples of a multi-core processor include two, four, eight, or greater numbers of processing cores. Alternatively or in addition, the processor 1403 may include one or more microprocessors configured in tandem via the bus 1401 to enable independent execution of instructions, pipelining, and multithreading. The processor 1403 may also be accompanied with one or more specialized components to perform certain processing functions and tasks such as one or more digital signal processors (DSP) 1407, or one or more application-specific integrated circuits (ASIC) 1409. A DSP 1407 typically is configured to process real-world signals (e.g., sound) in real time independently of the processor 1403. Similarly, an ASIC 1409 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1403 and accompanying components have connectivity to the memory 1405 via the bus 1401. The memory 1405 includes both dynamic memory (e.g., RAM, magnetic disk, writable optical disk, etc.) and static memory (e.g., ROM, CD-ROM, etc.) for storing executable instructions that when executed perform the inventive steps described herein to provide awareness information over an ad-hoc mesh network 109. The memory 1405 also stores the data associated with or generated by the execution of the inventive steps.

Figure 15:
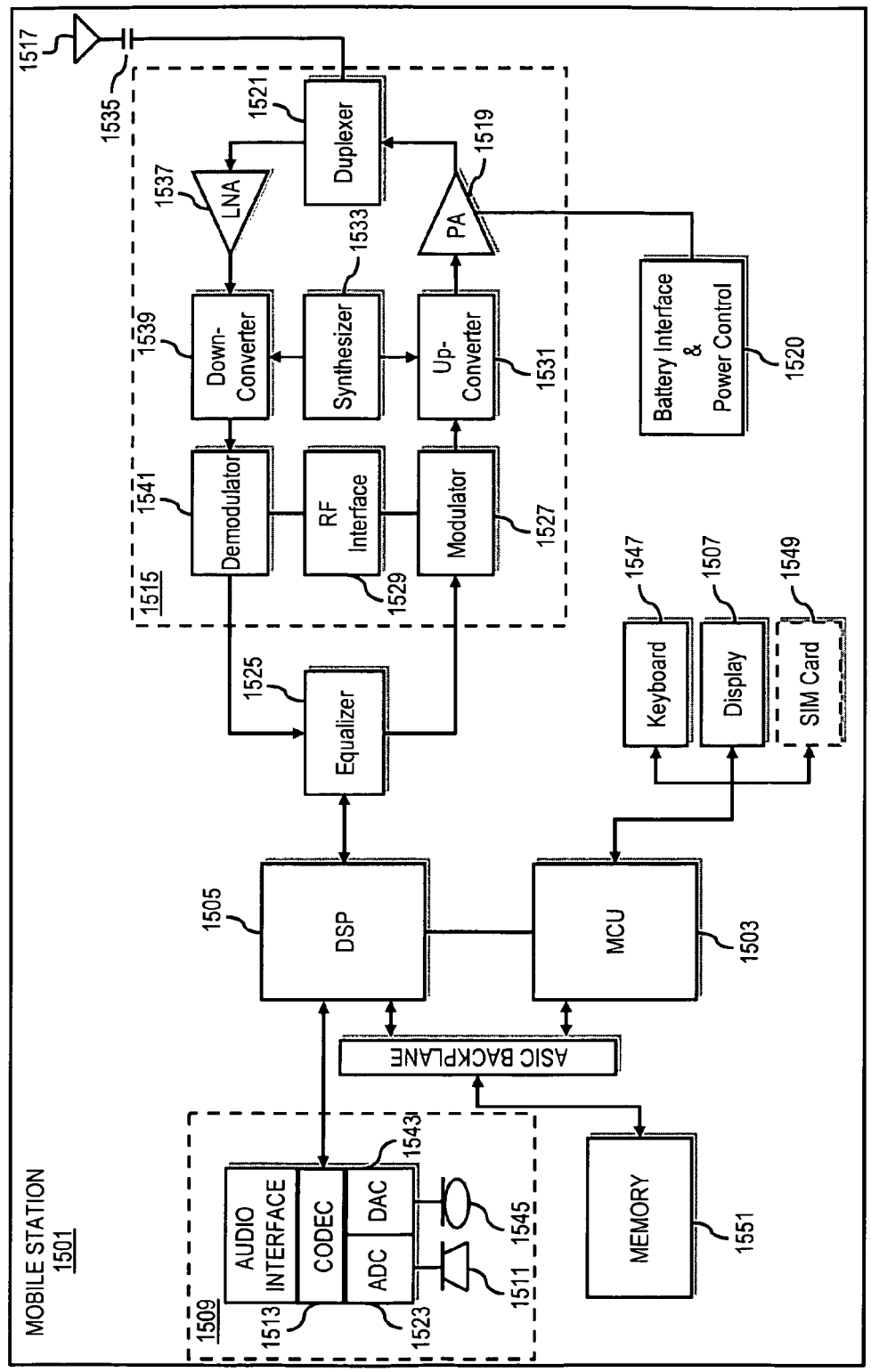
FIG. 15 is a diagram of a mobile station (e.g., handset) that can be used to implement an embodiment of the invention.

FIG. 15 is a diagram of exemplary components of a mobile station (e.g., handset) capable of operating in the system of FIG. 1, according to an exemplary embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1503, a Digital Signal Processor (DSP) 1505, and a receiver/transmitter unit including a microphone gain control unit and a speaker gain control unit. A main display unit 1507 provides a display to the user in support of various applications and mobile station functions such as the awareness services module 111. An audio function circuitry 1509 includes a microphone 1511 and microphone amplifier that amplifies the speech signal output from the microphone 1511. The amplified speech signal output from the microphone 1511 is fed to a coder/decoder (CODEC) 1513.

A radio section 1515 amplifies power and converts frequency in order to communicate with a base station, which is included in a mobile communication system, via antenna 1517. The power amplifier (PA) 1519 and the transmitter/modulation circuitry are operationally responsive to the MCU 1503, with an output from the PA 1519 coupled to the duplexer 1521 or circulator or antenna switch, as known in the art. The PA 1519 also couples to a battery interface and power control unit 1520.

In use, a user of mobile station 1501 speaks into the microphone 1511 and his or her voice along with any detected background noise is converted into an analog voltage. The analog voltage is then converted into a digital signal through the Analog to Digital Converter (ADC) 1523. The control unit 1503 routes the digital signal into the DSP 1505 for processing therein, such as speech encoding, channel encoding, encrypting, and interleaving. In the exemplary embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1525 for compensation of any frequency-dependent impairments that occur during transmission though the air such as phase and amplitude distortion. After equalizing the bit stream, the modulator 1527 combines the signal with a RF signal generated in the RF interface 1529. The modulator 1527 generates a sine wave by way of frequency or phase modulation. In order to prepare the signal for transmission, an up-converter 1531 combines the sine wave output from the modulator 1527 with another sine wave generated by a synthesizer 1533 to achieve the desired frequency of transmission. The signal is then sent through a PA 1519 to increase the signal to an appropriate power level. In practical systems, the PA 1519 acts as a variable gain amplifier whose gain is controlled by the DSP 1505 from information received from a network base station. The signal is then filtered within the duplexer 1521 and optionally sent to an antenna coupler 1535 to match impedances to provide maximum power transfer. Finally, the signal is transmitted via antenna 1517 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1501 are received via antenna 1517 and immediately amplified by a low noise amplifier (LNA) 1537. A down-converter 1539 lowers the carrier frequency while the demodulator 1541 strips away the RF leaving only a digital bit stream. The signal then goes through the equalizer 1525 and is processed by the DSP 1505. A Digital to Analog Converter (DAC) 1543 converts the signal and the resulting output is transmitted to the user through the speaker 1545, all under control of a Main Control Unit (MCU) 1503-which can be implemented as a Central Processing Unit (CPU) (not shown).

The MCU 1503 receives various signals including input signals from the keyboard 1547. The keyboard 1547 and/or the MCU 1503 in combination with other user input components (e.g., the microphone 1511) comprise a user interface circuitry for managing user input. The MCU 1503 runs a user interface software to facilitate user control of at least some functions of the mobile station 1501. The MCU 1503 also delivers a display command and a switch command to the display 1507 and to the speech output switching controller, respectively. Further, the MCU 1503 exchanges information with the DSP 1505 and can access an optionally incorporated SIM card 1549 and a memory 1551. In addition, the MCU 1503 executes various control functions required of the station. The DSP 1505 may, depending upon the implementation, perform any of a variety of conventional digital processing functions on the voice signals. Additionally, DSP 1505 determines the background noise level of the local environment from the signals detected by microphone 1511 and sets the gain of microphone 1511 to a level selected to compensate for the natural tendency of the user of the mobile station 1501.

The CODEC 1513 includes the ADC 1523 and DAC 1543. The memory 1551 stores various data including call incoming tone data and is capable of storing other data including music data received via, e.g., the global Internet. The software module could reside in RAM memory, flash memory, registers, or any other form of writable storage medium known in the art. The memory device 1551 may be, but not limited to, a single memory, CD, DVD, ROM, RAM, EEPROM, optical storage, or any other non-volatile storage medium capable of storing digital data.

An optionally incorporated SIM card 1549 carries, for instance, important information, such as the cellular phone number, the carrier supplying service, subscription details, and security information. The SIM card 1549 serves primarily to identify the mobile station 1501 on a radio network. The card 1549 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    discovering local information by broadcasting an anonymous propagating multi-hop flooding message including a query over a wireless ad-hoc mesh network without the use of internet protocols; and
    receiving a reply to the anonymous propagating multi-hop flooding message from a wireless node, which receives the anonymous propagating multi-hop flooding message, over the ad-hoc mesh network without the use of internet protocols, wherein
    the wireless node receiving the anonymous propagating multi-hop flooding message includes a message table containing flooding messages the wireless node has scheduled to be transmitted,
    the message table is updated to include the received anonymous propagating multi-hop flooding message that the wireless node has scheduled to be transmitted, each entry in the message table contains the anonymous propagating multi-hop flooding message, the time when the anonymous propagating multi-hop flooding message is scheduled to be sent, and a number of receptions of a same anonymous propagating multi-hop flooding message by the wireless node,
    the anonymous propagating multi-hop flooding message is removed from the message table at a time a maximum number of receptions of the same anonymous propagating multi-hop flooding message is reached,
    the reply includes a pointer or small-volume data related to the discovered local information,
    the anonymous propagating multi-hop flooding message is transmitted to the neighboring nodes in connectionless manner without the need to send any prior control signals or messages to the neighboring nodes before the transmission or without knowledge of the addresses of the neighboring nodes, and
    the neighboring nodes to which the anonymous propagating multi-hop flooding message is transmitted include one or more nodes that are different from node from which the anonymous propagating multi-hop flooding message is received.

2. A method of claim 1, wherein the a network layer identification associated with the wireless node is periodically changed.

3. A method of claim 1, wherein each beaconing period of a device-to-device radio layer of the wireless node is on an order of hundreds of milliseconds and each awake period of the device-to-device radio layer of the wireless node is only a few milliseconds.

4. A method of claim 1, wherein the reply to the anonymous propagating multi-hop flooding message from the wireless node is used by the wireless node to identify active communities within a neighborhood and to update a list of visible community members in the neighborhood.

5. A method of claim 1, further comprising:
generating the anonymous propagating multi-hop flooding message to include one or more anonymized community identifiers,
wherein the one or more anonymized community identifiers specify the respective communities to which the anonymous propagating multi-hop flooding message is directed.

6. A method comprising:
receiving at a wireless node, without the use of internet protocols, an anonymous propagating multi-hop flooding message including a query for discovering local information over an ad-hoc mesh network; and
initiating transmission of a reply to the anonymous propagating multi-hop flooding message without the use of internet protocols, wherein
the wireless node receiving the anonymous propagating multi-hop flooding message includes a message table containing flooding messages the wireless node has scheduled to be transmitted,
the message table is updated to include the received anonymous propagating multi-hop flooding message that the wireless node has scheduled to be transmitted,
each entry in the message table contains the anonymous propagating multi-hop flooding message, the time when the anonymous propagating multi-hop flooding message is scheduled to be sent, and a number of receptions of a same anonymous propagating multi-hop flooding message by the wireless node,
the anonymous propagating multi-hop flooding message is removed from the message table at a time a maximum number of receptions of the same anonymous propagating multi-hop flooding message is reached,
the reply includes a pointer or small-volume data related to the discovered local information,
the anonymous propagating multi-hop flooding message is transmitted to neighboring nodes in connectionless manner without the need to send any prior control signals or messages to the neighboring nodes before the transmission or without knowledge of the addresses of the neighboring nodes, and
the neighboring nodes to which the anonymous propagating multi-hop flooding message is transmitted include one or more nodes that are different from node from which the anonymous propagating multi-hop flooding message is received.

7. A method of claim 6, further comprising:
filtering the anonymous propagating multi-hop flooding message by comparing a set of anonymized community identifiers stored in a replying wireless node against one or more anonymized community identifiers included in the anonymous propagating multi-hop flooding message,
wherein a replying wireless node in the ad-hoc network contains a set of anonymized community identifiers corresponding respectively to each community to which the wireless node belongs.

8. A method of claim 6, further comprising:
determining whether a wireless node contains or has access to the queried local information; and
initiating transmission of the reply based on the determination,
wherein personal information in the reply is anonymized.

9. A method of claim 6, wherein the local information is location indication data, an indication of a location event, an indication of location-based service matching the query, or a combination thereof.

10. A wireless node comprising:
at least one processor; and
at least one memory including computer program code,
the at least one memory and the computer program code configured to, with the at least one processor, cause the wireless node to perform at least the following,
receive at the wireless node, without the use of internet protocols, an anonymous propagating multi-hop flooding message including a query for discovering local information over an ad-hoc mesh network, and
initiate transmission of a reply to the anonymous propagating multi-hop flooding message without the use of internet protocols, wherein
the wireless node that receives the anonymous propagating multi-hop flooding message includes a message table containing flooding messages the wireless node has scheduled to be transmitted,
the message table is updated to include the received anonymous propagating multi-hop flooding message that the wireless node has scheduled to be transmitted,
each entry in the message table contains the anonymous propagating multi-hop flooding message, the time when the anonymous propagating multi-hop flooding message is scheduled to be sent, and a number of receptions of a same anonymous propagating multi-hop flooding message by the wireless node,
the anonymous propagating multi-hop flooding message is removed from the message table at a time a maximum number of receptions of the same anonymous propagating multi-hop flooding message is reached,
the reply includes a pointer or small-volume data related to the discovered local information,
the anonymous propagating multi-hop flooding message is transmitted to the neighboring nodes in connectionless manner without the need to send any prior control signals or messages to the neighboring nodes before the transmission or without knowledge of the addresses of the neighboring nodes, and
the neighboring nodes to which the anonymous propagating multi-hop flooding message is transmitted include one or more nodes that are different from node from which the anonymous propagating multi-hop flooding message is received.

11. A wireless node of claim 10, wherein a network layer identification associated with the wireless node is periodically changed.

12. A wireless node of claim 10, wherein each beaconing period of a device-to-device radio layer of the wireless node is on an order of hundreds of milliseconds and each awake period of the device-to-device radio layer of the wireless node is only a few milliseconds.

13. A wireless node of claim 10, wherein the reply to the anonymous propagating multi-hop flooding message from the wireless node is used by the wireless node to identify active communities within a neighborhood and to update a list of visible community members in the neighborhood.

14. A wireless node of claim 10, wherein the wireless node is further caused to:
generate the anonymous propagating multi-hop flooding message to include one or more anonymized community identifiers,
wherein the one or more anonymized community identifier specify the respective communities to which the anonymous propagating multi-hop flooding message is directed.

15. A wireless node of claim 10, wherein the the wireless node is a mobile phone further comprising:
  user interface circuitry and user interface software configured to facilitate user control of at least some functions of the mobile phone through use of a display and configured to respond to user input; and
  a display and display circuitry configured to display at least a portion of a user interface of the mobile phone, the display and display circuitry configured to facilitate user control of at least some functions of the mobile phone.

16. A wireless node of claim 15, wherein the mobile phone includes a radio for device-to-device communication over the ad-hoc mesh network.

17. A wireless node of claim 10, wherein the wireless node is further caused to:
  filter the anonymous propagating multi-hop flooding message by comparing a set of anonymized community identifiers stored in a replying wireless node against one or more anonymized community identifiers included in the anonymous propagating multi-hop flooding message,
  wherein a replying wireless node in the ad-hoc network contains a set of anonymized community identifiers corresponding respectively to each community to which the wireless node belongs.

18. A wireless node of claim 10, wherein the wireless node is further caused to:
  determine whether the wireless node contains or has access to information relevant to the queried local information; and
  initiate transmission of the reply based on the determination.

19. A wireless node of claim 10, wherein the local information is location indication data, an indication of a location event, an indication of location-based service matching the query, or a combination thereof.

20. A wireless node of claim 10,
  wherein the wireless node includes a community layer, a cognition layer, and a network layer connected between an application and a device to device radio layer, and
  wherein the community layer is connected between the cognition layer, which is a higher layer than the community layer, and the network layer, which is a lower layer than the community layer.

21. A wireless node of claim 20, wherein the cognition layer includes a control logic and a storage, and the reply is automatically stored in the storage.

22. A wireless node of claim 10, wherein the anonymous propagating multi-hop flooding message does not include a true identify of a sender of the anonymous propagating multi-hop flooding message.

* * * * *